US012659177B2

(12) United States Patent
    Cambou et al.

(10) Patent No.: US 12,659,177 B2
(45) Date of Patent: Jun. 16, 2026

(54) SYSTEMS AND METHODS USING SEARCH ENGINES TO GENERATE CRYPTOGRAPHIC KEYS FROM ERRATIC PHYSICAL UNCLONABLE FUNCTIONS

(71) Applicants:Arizona Board of Regents on Behalf of Northern Arizona University, Flagstaff, AZ (US); Government of the United States of America, as represented by the Secretary of the Air Force, Rome, NY (US)

(72) Inventors: Bertrand F. Cambou, Flagstaff, AZ (US); Sareh Assiri, Flagstaff, AZ (US); Christopher Robert Philabaum, Flagstaff, AZ (US); H. Shelton Jacinto, Rome, NY (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 96 days.

(21) Appl. No.: 18/893,566

(22) Filed: Sep. 23, 2024

(65) Prior Publication Data

US 2025/0016010 A1    Jan. 9, 2025

Related U.S. Application Data

(62) Division of application No. 17/849,623, filed on Jun. 25, 2022, now Pat. No. 12,126,740.

(Continued)

(51) Int. Cl.
    *H04L 9/32*      (2006.01)
    *H04L 9/08*      (2006.01)
    *H04L 9/14*      (2006.01)

(52) U.S. Cl.
    CPC .......... *H04L 9/3278* (2013.01); *H04L 9/0822* (2013.01); *H04L 9/0894* (2013.01); *H04L 9/3236* (2013.01); *H04L 9/14* (2013.01)

(58) Field of Classification Search
    USPC ......................................................... 713/189
    See application file for complete search history.

(56) References Cited

U.S. PATENT DOCUMENTS

| | | | | |
|---|---|---|---|---|
| 8,024,560 | B1 * | 9/2011 | Alten | .................. H04L 63/0428 |
| | | | | 713/193 |
| 2010/0250936 | A1 * | 9/2010 | Kusakawa | ............ H04L 9/3278 |
| | | | | 713/169 |

(Continued)

FOREIGN PATENT DOCUMENTS

| | | | | | |
|---|---|---|---|---|---|
| CN | 101847296 | A | * | 9/2010 | ........... H04L 9/3278 |
| EP | 3669488 | B1 | * | 10/2025 | ............. H04L 63/06 |
| ES | 2842954 | T3 | * | 7/2021 | ........... H04L 9/0858 |

OTHER PUBLICATIONS

Wright et al, "A Symmetric Cipher Response-Based Cryptography Engine Accelerated Using GPGPU", Oct. 4-6, 2021, 2021 IEEE Conference on Communications and Network Security (CNS), pp. 146-154 (Year: 2021).*

*Primary Examiner* — Sakinah White-Taylor
(74) *Attorney, Agent, or Firm* — Quarles & Brady LLP

(57) ABSTRACT

Systems and methods for providing authentication and secure cryptographic communication between a client and server are described. The client includes an addressable array of PUF devices. The client receives or generates a set of instructions usable to determine a range of PUF addresses. The client measures the PUF addresses and generates a first set of responses. The responses are used to encrypt a session key, which is stored, along with the instructions and a hash of the responses, at the client. Later, the client may recover the session key by using the instruc- (Continued)

(b) RBC search engine tions to measure the PUF again, resulting in a second set of responses. Using a response-based cryptography search engine, the client may then iteratively modify and hash the second set of responses until a response set is uncovered that matches the first response set. This modified response set may then be used to uncover the session key.

10 Claims, 12 Drawing Sheets

Related U.S. Application Data

(60) Provisional application No. 63/254,486, filed on Oct. 11, 2021, provisional application No. 63/215,344, filed on Jun. 25, 2021.

(56) References Cited

U.S. PATENT DOCUMENTS

| | | | | |
|---|---|---|---|---|
| 2018/0183613 | A1* | 6/2018 | Dafali | H04L 9/3278 |
| 2021/0036872 | A1* | 2/2021 | Abeln | G11C 7/24 |
| 2021/0281432 | A1* | 9/2021 | Cambou | H04L 9/3278 |

* cited by examiner

| Fragmentation k | 1 | 2 | 4 | 8 |
|---|---|---|---|---|
| Maximum BER to keep the latencies below 1s | 1.2% | 2.6% | 6.4% | 16.8% |
| Size of the message digests | 256 bits | 512 bits | 1Kbyte | 2Kbyte |

*FIG. 12*

SYSTEMS AND METHODS USING SEARCH ENGINES TO GENERATE CRYPTOGRAPHIC KEYS FROM ERRATIC PHYSICAL UNCLONABLE FUNCTIONS

CROSS-REFERENCE TO RELATED APPLICATIONS

The present application is a divisional of U.S. patent application Ser. No. 17/849,623 of the same title, filed on Jun. 25, 2022, which claims priority to U.S. Provisional Application 63/254,486 entitled "Systems and Methods Using Search Engines to Generate Cryptographic Keys from Erratic Physical Unclonable Functions," filed on Oct. 11, 2021, and U.S. Provisional Application No. 63/215,344, entitled "Using Search Engines to Generate Cryptographic Keys from Erratic Physical Unclonable Functions," filed on Jun. 25, 2021. All of these applications are incorporated herein by reference in their entirety.

STATEMENT REGARDING FEDERALLY-SPONSORED RESEARCH

This invention was supported by the United States Air Force Research Laboratory under contract FA8750-19-2-0503. The Government has certain rights therein.

BACKGROUND OF THE INVENTION

Physical unclonable functions (PUFs) that are unique to a device allow an authentication system to challenge a client seeking authentication, receive a response generated by the client using a PUF device, and then compare the received with a stored response previously received from the client or derived from characteristics of the PUF device and verifying that the two responses match. PUF technologies take advantage of unique characteristics of each device caused by natural manufacturing variations unique to that device. When clients seeking authentication have arrays of PUF devices, a number of possible challenge responses may be generated in response to varying challenges. The generation of challenge responses may need to be reproducible, predictable, and easy to recognize during the authentication process for the challenge-response authentication to be useful. PUF responses, generated by a client device having a PUF may be used to generate encryption keys, and initial PUF responses, previously measured and stored in a database in communication with a service device, may be used to generate a matching encryption key. The server and client side keys may to used to support encrypted communication between the server and client devices.

PUF responses may vary over time as the PUF device ages, degrades, or is subject to temperature changes. These drift mechanisms may cause a PUF, for example a PUF in a client device, to return different responses than the responses stored at the server device, which may have been measured under different conditions. Mismatch between the client PUF responses and the initial responses may prevent authentication between client and server, and may result in mismatched keys being generated on the client and server sides. The instant disclosure is directed at solutions to this problem.

BRIEF SUMMARY

In an example embodiment systems and methods for providing secure communication between a client and server computing device are disclosed. One arrangement is directed to a method of authenticating a client device possessing a physical-unclonable-function ("PUF") array having a plurality of PUF devices. According to the method a PUF challenge is provided to the client device. This can be internally generated, or externally generated (e.g., by a server) and sent to the client device. The challenge identifies, or is usable to identify, a range of devices in the PUF array, and optionally, measurement conditions for those devices. An example challenge would be array of addresses of PUF devices within a PUF array.

Additionally, a device (e.g., the server) determines an expected PUF response to the challenge by retrieving from a database previously measured PUF responses of the devices identified by the challenge. The server then divides the expected PUF response into a plurality of expected response fragments. Each response fragment is used to generate an expected ciphertext fragment, e.g., by hashing. Before this step, the server may expand the expected response fragment with nonce or random bits, for example, to provide the correct length input to a hashing algorithm. Additionally, the server may receive a series of received ciphertext fragments from the client device; each received ciphertext fragment being generated from a portion of a bitstream reflecting measured PUF responses generated by measuring physical characteristics of devices of the PUF array identified by the challenge.

The server may then compare corresponding fragment pairs, each fragment pair comprising an expected response fragment and a corresponding received ciphertext fragment, to determine a degree of match between the expected response fragment and the ciphertext fragment in each fragment pair. If a match is determined, the expected response fragments may be assembled into a cryptographic session key that may be used to communicate with a matching session key generated at the client using the same measured PUF responses.

If the fragments do not match, the server may, for mismatched fragment pairs, iteratively alter the bits of unmatching expected response fragments until they match the corresponding received fragment. The result of this process will be a collection of response fragments generated from the server's PUF image, some of which may have been modified, but where the resulting collection matches the client's measured response. In this case again, the result is a matching pair of session keys that may be used for cryptographic communication or authentication.

In another embodiment, a method of cryptographic communication from a client device having a physical-unclonable-function ("PUF") array having a plurality of PUF devices is disclosed. Under this method, the client may recover a session key by a recovery procedure. The recovery procedure involves receiving a set of instructions including PUF challenges identifying a range of devices in the PUF array, receiving a first ciphertext generated from a first set of measured PUF responses reflecting measurements of physical characteristics of devices of the PUF array identified by the PUF challenges and receiving an encrypted session key generated by encrypting a session key using the first set of measured PUF responses. The client measures a second set of measured PUF responses reflecting measurements of physical characteristics of devices of the PUF array identified by the PUF challenges and generates a second ciphertext from the second set of measured PUF responses. The client then compares the second ciphertext with the first ciphertext; and if the second ciphertext matches the first ciphertext, using second set of measured PUF responses to decrypt the encrypted session key.

In the event that the first ciphertext does not match the second ciphertext, the client may perform a search with a client processor for a set of modified PUF responses a fixed Hamming distance from the second set of measured PUF responses, the modified PUF responses being usable to generate a ciphertext that matches the first ciphertext.

Prior to these key recovery steps, the client may execute a preparation procedure including using a random number to generate the set of instructions including PUF challenges identifying a range of devices in the PUF array; measuring physical characteristics of devices of the PUF array identified by the PUF challenges to generate the first set of PUF responses; generating the first ciphertext using the first set of PUF responses and encrypting a session key using the first set of PUF responses.

In another embodiment, a method for secure communication between a server computing device and a client computing device having a physical-unclonable-function ("PUF") array having a plurality of PUF devices is provided. The method includes, at the server, generating a set of instructions including PUF challenges identifying a range of devices in the PUF array, and sending the instructions to the client. The method further includes, at the client, receiving the instructions from the server; measuring a first set of PUF responses reflecting measurements of physical characteristics of devices of the PUF array identified by the PUF challenges; generating a first ciphertext from the first set of PUF responses; encrypting a session key with the first set of PUF responses; and storing, in a database at the client, the instructions, the first ciphertext and the encrypted session key. This information may be used to recover the session key. The client may then use the recovered session key to encrypt or cryptographically sign a data file with the session key and send the encrypted or signed data file to another computing device.

The session key in one embodiment may be recovered by the client by retrieving, from the database at the client, the instructions, the first ciphertext and the encrypted session key. The client may then measure a second set of PUF responses reflecting measurements of physical characteristics of devices of the PUF array identified by the PUF challenges; generate a second ciphertext from the second set of PUF responses, and compare the second ciphertext with the first ciphertext. If the second ciphertext matches the first ciphertext, the client may use the second set of PUF responses to decrypt the encrypted session key. If the second ciphertext does not match the first ciphertext, the client performs a search with a client processor for a set of modified second PUF responses a fixed Hamming distance from the second set of measured PUF responses, the modified second PUF responses being usable to generate a third ciphertext that matches the first ciphertext, and then uses the modified second PUF responses to decrypt the encrypted session key.

The above features and advantages of the present invention will be better understood from the following detailed description taken in conjunction with the accompanying drawings.

BRIEF DESCRIPTION OF THE DRAWINGS

The drawings described herein constitute part of this specification and includes example embodiments of the present invention which may be embodied in various forms. It is to be understood that in some instances, various aspects of the invention may be shown exaggerated or enlarged to facilitate an understanding of the invention. Therefore, drawings may not be to scale.

FIG. 12 is a table showing the efficiency of the RBC search for 256-bit responses.

DETAILED DESCRIPTION

Figure 1:
FIG. 1 depicts an enrollment procedure wherein a server issues challenges to clients having PUF arrays and stores responses to those challenges for use in subsequent authentication of the clients, according to one embodiment.

The described features, advantages, and characteristics may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access or control access to a particular computing device or resource. In particular, a server, as used herein, may be a computing device having a programmable processor capable of executing computer executable program instructions to carry out the various computation and communication method steps described below. The programmable processor is also capable of receiving such instructions over a communication channel, and/or reading such instructions from a computer readable memory, which may be volatile or non-volatile.

Similarly, references to a "server" refer generally to a computing device acting as a client, or processes executing in any combination of hardware, software, or firmware. In particular, a client, as used herein, may be a computing device having a programmable processor capable of executing computer executable program instructions to carry out the various computation and communication method steps described below. The programmable processor is also capable of receiving such instructions over a communication channel, and/or reading such instructions from a computer readable memory, which may be volatile or non-volatile.

Conventional systems and methods for challenge-response authentication have disadvantages. For example, when the server and the client communicate over an insecure channel, both the challenges and the challenge responses may be intercepted, providing information which may be useful to an attacker. In addition, conventional PUF-based challenge response systems may experience errors due to nondeterministic behavior of individual devices in PUF arrays. Such errors may be due to various drift factors, such as variations in the measurement conditions of the client side PUF, or other changes that may occur at the client side PUF over time. Conventionally, in an authentication paradigm, a slightly different-than-expected client PUF response may still be used for authentication if it sufficiently similar to an expected response stored at the server. However, cryptographic key generation requires a closer match between client and server PUF responses. Thus, even if these error rates are acceptable for authentication purposes, they are often much too high for other applications such as allowing two devices to agree on a shared encryption key.

Accordingly, embodiments disclosed herein address these and other shortcomings by using physical unclonable function (PUF) generators (APGs) with improved error rates to enable simultaneous authentication of client devices and generation of encryption keys, thereby allowing one or more devices to reliably exchange information securely over potentially insecure channels without requiring excessive latencies and use of computing resources.

In the context of this disclosure, a challenge is any information transmitted to an APG to cause production of an expected response (referred to as a "challenge response") corresponding to that information. Challenge responses may be generated by accessing devices (or ranges of devices) in an array of PUF devices belonging to the APG. Along these lines, a challenge may be input supplied to an APG which is used to produce a response having one or more expected values which depend upon characteristics' of the PUF array belonging to the APG to which the challenge is issued. The appropriate challenge response may be derived from those characteristics using instructions stored by the APG or other processing circuitry, received by the APG or other processing circuitry and/or additional information supplied to the APG or other processing circuitry (such as a password of a user). In one simple non-limiting example, a challenge might simply be returning the values stored by devices of a PUF array at a specified address or range of addresses. In other non-limiting examples, a challenge might include instructions to perform a mathematical, logical, or other operation(s) on those values.

Non-limiting examples of measurable physical characteristics of devices used in PUF arrays are time delays of transistor-based ring oscillators and transistor threshold voltages. Additional examples include data stored in SRAM or information derived from such data. For instance, in a PUF array based on SRAM cells, an example of such physical characteristics may be the effective stored data values of individual SRAM devices (i.e., "0" or "1") after being subjected to a power-off/power-on cycle. Because the initial state (or other characteristics) of an individual PUF device may not be perfectly deterministic, statistics produced by repeated measurements of a device may be used instead of single measurements. In the example of an SRAM-based PUF device, the device could be power-cycled 100 times and the frequency of the "0" or "1" state could be used as a characteristic of that device. Other non-limiting examples of suitable characteristics include optical measurements. For instance, a PUF device may be an optical PUF device which, when illuminated by a light source such as a laser, produces a unique image. This image may be digitized and the pixels may be used as an addressable PUF array. A good PUF should be predictable, and subsequent responses to the same challenge should be similar to each other (and preferably identical). The quantification of the quality of the PUF may be given by the Hamming distances (or another similarity metric) between initial responses and subsequent responses, also defined as the challenge-response pair (CRP) error rate. Hamming distance is used throughout this disclosure as a useful measure of the similarity or difference between two strings (such as challenges and responses). However, it should be understood that other measures of the similarity or difference between two strings may be used and that Hamming distances are used herein for the purposes of illustration. The Hamming distance may be particularly useful when PUF responses are sequential strings with each element generated by accessing a distinct PUF device belonging to an array. In this instance, the Hamming distance between a response to a challenge and an earlier response (or expected response) to that same challenge will indicate the number of PUF devices which produced unexpected outputs.

According to various embodiments, a PUF-enabled authentication protocol includes the following stages: (1) Enrollment, (2) Handshaking, and (3) Authentication/Encryption Key generation. These stages are described below, beginning with reference to FIG. 1 illustrating an example environment 100 in which embodiments disclosed herein may be practiced. The environment 100 includes a server 102 and client devices, hereinafter clients 105 (represented by clients 105a, 105j, and 105n). The server 102 manages a database 104 which may be stored in memory of the server 102. The database 104 stores a set of initial challenge responses 130, which may be generated in response to challenges issued by the server 102 to the clients 105, each of which may respond to the challenges by accessing a respective PUF array 160 represented by the PUF arrays 160a, 160j, and 160n belonging to clients 105a, 105j, and 105n. Alternatively, the server 102 may be otherwise provided with information suitable to generate the initial challenge responses 130.

A PUF array 160 may form parts of an addressable PUF generator (APG), described further below, which may contain additional processing circuitry and execute instructions for generating challenge responses. Enrollment is performed for each client 105 in a secure environment. After enrollment, the constellation of clients 105 may operate in an insecure environment and communicate with each other over public networks. Secure information needs to be encrypted.

Figure 2:
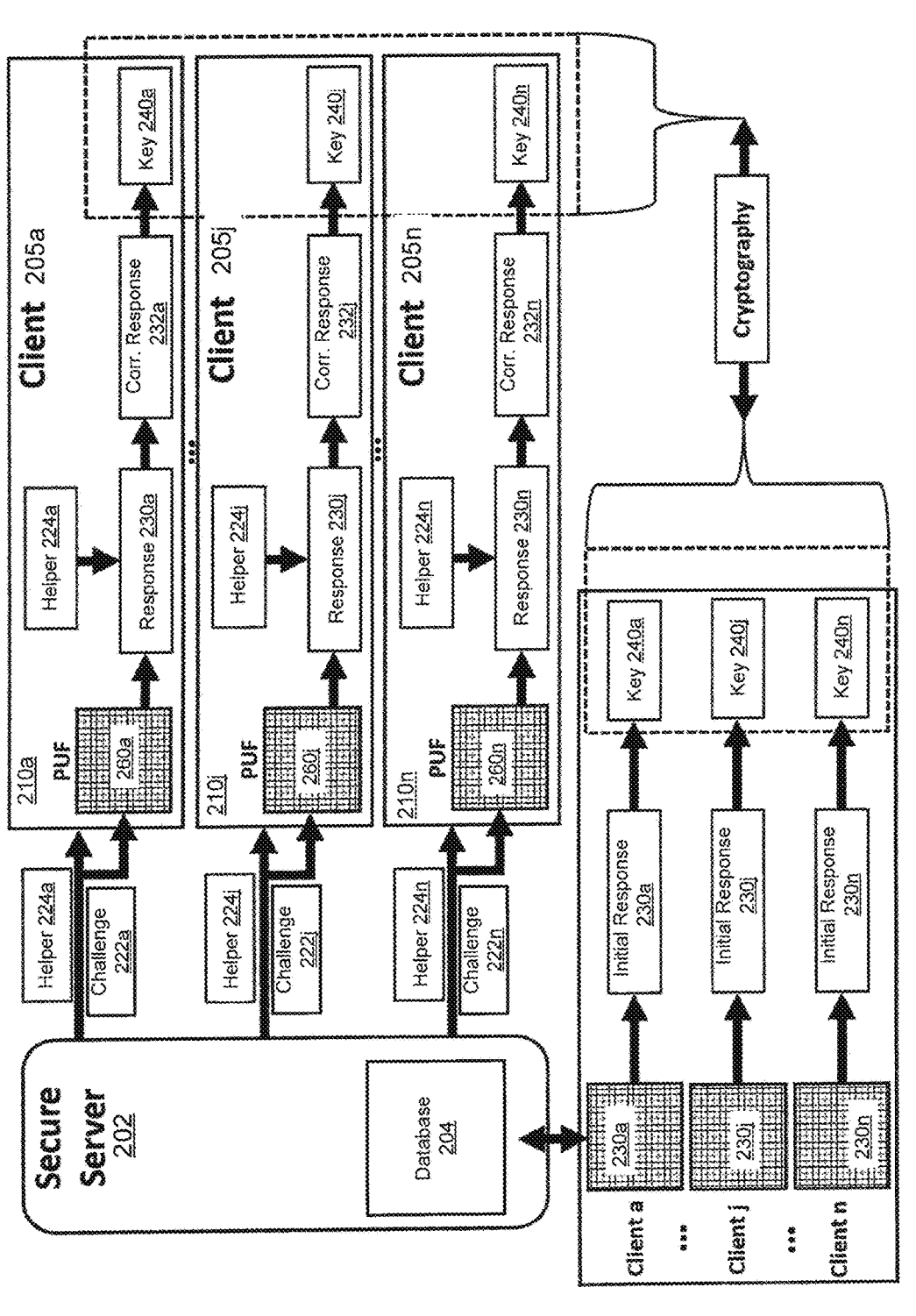
FIG. 2 is a block diagram of client devices with addressable PUF generators (APGs), interacting with a server to independent generates shared encryptions keys according to one embodiment.

FIG. 2 illustrates a simplified example embodiment 200 of clients 205 (i.e., clients {205a, . . . 205j, . . . 205n}) having APGs 210 (i.e., APGs {210a, . . . 210j, . . . 210n}) belonging to a client 205, interacting with a server 202 according to embodiments disclosed herein. Each APG 210 includes a PUF array 260 (i.e., APGs {260a, . . . 260j, . . . 260n}) which may be accessed by a microcontroller or other processing circuitry of each client 205. The PUF array 260 of a client 205 is an array of electronic or other devices with measurable physical characteristics, configured in an addressable array similar to an addressable memory device such as RAM or ROM chip. Due to small variations which occur during semiconductor manufacturing or other manufacturing processes, each PUF device (and hence each PUF array 260) may be unique, even if the PUF arrays are mass-produced by a process designed to produce nominally identical devices. The PUF array 210 (shown as a 2D-array of cells) of a client 205 may be accessed by the client 205 which receives challenges 222 (originating in this example from the server 202). The APG 210 responds by to challenges 222 by generating responses 230 using measured characteristics of one or more PUF devices within the PUF array 260 identified by the challenge 222 or derived from it using instructions stored by the APG 210.

Each client 205 (represented by "Client a", "Client j", and "Client n", i.e, clients 205a, 205j, and 205n shown) has an APG 210 containing a PUF array 260 that is unique to that client 205. The APG 210 of a client 205 may be used to generate numerous responses 230 (i.e., responses {230a, . . . 230j, . . . 230}) unique to that client 205. These responses 230 cannot be replicated by an attacker without physical access to the PUF array 260. During the Enrollment stage, the server 202 may obtain the initial responses 230 for each client 205 by generating all possible challenges 222 and storing responses 230 to those challenges 222 generated by each APG 210 in a database 204. Alternatively, the server 202 may be otherwise supplied with characteristics of each PUF array 260 sufficient to generate the expected responses 230. The microcontroller 220 may include instructions to combine information from the challenge 222 with additional information (such as a user password 223) and pass the combination through a hash function 221 the result to produce the address 225 (or range of addresses) within the PUF array 260 to measure in order to generate the proper response 230.

After the clients 205 are enrolled with the server 202, embodiments disclosed herein may be utilized to authenticate the client 205 and produce an encryption key which the server 202 and client 205 may use to communicate securely. First, the server 202 and a client 205 (such as "Client j" shown in FIG. 2A) enter the Handshaking stage. In the Handshaking stage an objective is for the server 202 to transmit the information needed to identify a particular portion of the PUF array 260 of the client 205. Both the server 202 and the client 205 can independently produce a response to the challenge: the server can lookup information about the PUF array 260 obtained during enrollment (or otherwise supplied to the server 202) and the client 205 can retrieve the same information by using the APG 210 to access the PUF array 260.

During Handshaking, the server 202 issues a challenge 222 to the APG 210 of the client 205. This challenge 222 is used by the APG 210 to identify the portion of the devices belonging to the PUF array 260 to access. This challenge 222 may be a random number. In some embodiments, the server 202 and the client 205 may have access to the same random number generator or may have synchronized random number generators. In such embodiments, the server 202 does not need to transmit the challenge 222 to the client 205 in order for the client 205 to generate the challenge response 230 using the APG 210.

In some embodiments the ability of the client 205 to generate the challenge response 230 may be protected by a password. In such embodiments, the address specifying which device(s) in the PUF array 260 to access may be produced by combining the challenge 222 with the password. As a non-limiting example, the client 205 may input the password and the challenge into a hashing function to produce the address in the PUF array 260. As an example, if the PUF array 260 is represented as a two-dimensional array containing 256 rows and 256 columns, 8 bits of the message digest can be used to find the first coordinate X in the PUF array 260; the following 8 bits can be used to find the second coordinate Y.

As discussed above, the measurement of characteristics of individual PUF devices may not be perfectly deterministic. For example, measured PUF responses may drift over time such that they do not perfectly correspond to the initial responses measured and stored during enrollment. One way to deal with this problem is for the server to send to the client helper instructions, e.g., error correction codes (ECC) usable by the client to correct its measured PUF responses. Accordingly, as part of the Handshaking process, the server 202 may send additional information (helper instructions or ECC) to the client 205 for use in making generation of the challenge response 230 more reliable. The helper instructions 224 (i.e., helper instructions {224a, . . . 224j, . . . 224n}) may include a checksum or other error-correcting information for use with error-correcting codes, or other information or instructions used in response generation schemes to be discussed later below. Upon receiving the challenge response 230, the APG 210 may use the helper instructions 224 to generate corrected responses 232 (i.e., corrected responses {232a, . . . 232j, . . . 232n}). Use of the helper instructions 224 and other methods of improving the reliability of the APG 210 will be discussed further below. The corrected responses 232 may be used directly as encryption keys 240 or may otherwise be used to derive the encryption keys 240. The server 202 may similarly independently produce the encryption keys 240 using the initial responses 230 stored in the database 204. The server 202 and the client 205 may then communicate securely by encrypting messages using the shared encryption keys 240.

The server 202 can authenticate a client 205 by issuing the challenge 222 to the client 205 and then comparing the corrected challenge response 232 generated by APG 210 with the initial response to that challenge stored by the server 202 for that client 205 (e.g., initial challenge responses 230) or determine that the corrected challenge response 232 is consistent with the initial challenge response 230 by comparing information derived from the corrected challenge responses 232 with information derived similarly by the server 202 from one of the initial challenge responses 230 corresponding to the challenge 232 issued by the server. The server 202 may require that the corrected response 232 is identical to the expected response to the challenge 222 (i.e., the initial response 230 corresponding to the challenge 222) in order to authenticate the client 205. Alternatively, the server 202 may accept a corrected response 232 with a Hamming distance (or a value of another distance metric) less than a predetermined maximum value from the expected response as evidence that the challenge response 230 is consistent with the expected response. For example, the server 202 may infer that the client 205 has generated a response which differs by less than a predetermined maximum number of symbols from the initial response 230 and determine that the challenge response 230 is consistent with the initial response 230 (i.e., was generated by a client 205 in possession of the same PUF array used to obtain the initial response 230). When the CRP error rates are relatively low, the responses can be used as part of authentication protocols. In such cases, Hamming distances between responses and the expected responses as large as 10% of the total response length may still be used to provide acceptable false-accept and false-reject rates (FRR and FAR). When the CRP error rates are too high, the use of error-correcting methods may be used to improve both FAR and FRR.

Without ECC, the bit error rates (BERs) between the initial responses and the subsequent responses may be in the 5-10% range, which is acceptable for most authentication cycles. To determine how such error rates impact cryptographic key generation and use, it is useful to track false acceptance rates (FARs) and false reject rates (FRRs). When the CRP error rates are higher, the use of error correcting methods, helper streams or other methods is usually needed to improve both the FAR and FRR. This is because even a single-bit error in an encryption key may produce a ciphertext which cannot be correctly decrypted.

When ECC is used to correct response errors generated by the PUF at the client, the server analyses server-side keys generated from the initial responses stored in the look-up tables during enrolment to compute the data helpers needed for the ECC. The server transmits these helpers to the client device, preferably confidentially. The client device generates from the PUFs the cryptographic keys and corrects them with the ECC and the data helpers. The corrected keys are ideally perfectly identical to the keys generated by the server.

Although the use of helper instructions and ECC (e.g., the helper instructions 224) can reduce error rates, such approaches have disadvantages. First, the client devices (e.g., the clients 205) need to consume additional computing resources to implement the helper instructions (e.g., error-correcting codes, fuzzy extractors, et al.). However, in some applications doing so may result in increased complexity and power consumption and may be impractical (e.g., in IoT and other low-power devices). Second, such protocols increase the vulnerability to side-channel attacks, differential power analysis, and potential exposure of the helpers. In addition, the use of APGs to generate challenge responses for use in generating encryption keys is more challenging than using APGs to generate responses for authentication. For example, if the server 202 generates an encryption key (e.g., an encryption key 240) using one of the initial responses 230 and a client 205 attempts to generate the same encryption key from responding to an appropriate challenge 222, the process will fail if the client-generated encryption key differs from the server-generated encryption key by even a single bit. However, typical PUF arrays may exhibit CRP errors at rates of approximately 3-10% (or even higher, as set forth above) due to temperature changes, noise sources, aging, or other parameter drifts. This process becomes increasingly challenging when the BERs between the original keys and the keys generated by the PUF are too high. The size of the helper data needs to be exponentially increased at higher levels of BERs. In order to correct 256-bit long keys generated from PUFs with BERs in the 10% range, 2 Kbyte long data helpers are typically needed. In certain applications, these data helpers need to be protected by encryption schemes to avoid leaks to the opponents.

Alternative approaches have been suggested for dealing with client-side PUF response errors in the cryptography context, which do not rely on helper instructions or ECC. Several such alternatives are described in U.S. patent application Ser. No. 16/598,985 entitled "Response-Based Cryptography Using Physical Unclonable Functions", the U.S. patent application Ser. No. 16/683,943 entitled "Unequally Powered Cryptography Using Physical Unclonable Functions", the disclosures of which are incorporated by reference herein in their entirety. These applications suggest dealing with non-zero CRP error rates for encryption-key-generation using "response-based-cryptography" or "RBC." RBC may be used independently, or in conjunction with helper instructions other error-mitigation schemes such as ternary PUF schemes described later below to realize improved performance. When used with ternary PUF schemes, for example, where erratic cells are identified and excluded, effective error rates below the level of $10^{-8}$ may be realized. Furthermore, comparable CRP error rates can be achieved by combining binary PUF error-correction methods capable of achieving CRP rates on the order of $10^{-3}$ on their own with RBC.

Generally speaking, in accordance with RBC methods, a computing device, typically the server, receives an encrypted message (i.e, ciphertext) from the client. The ciphertext may be based on plain text that is known to both client and server, which may be passed from client to server (e.g., as part of a message digest containing the PUF challenges), or may be independently generated by each device, for example, from previously stored message pairs, time synchronized random number generators or the like, or by some combination of the methods above. The client generates an encryption key from the client's uncorrected PUF responses, and uses that key to encrypt the plaintext resulting in the ciphertext which is sent to the server. The server has access to the initial PUF responses that are retrieved in response to the PUF challenges, and so, the server may generate a corresponding server-side key. The server uses its key to decrypt the ciphertext, and the decrypted plain text is compared to the original plain text used by the client to generate the ciphertext. If the plain text versions match, the devices must have matching keys, and so communication using the keys may proceed. If the plain text versions do not match, this indicates a mismatch between the measured, client-side PUF responses (and the resulting server key), and the retrieved, server-side responses (and the resulting client key). In such cases, the server uses an RBC search engine to search for a set of responses that generates a key that matches the key used by the client. This is done by iteratively perturbing the retrieved responses (i.e., the responses previously measured from the PUF and stored), generating new candidate keys, decrypting the ciphertext and comparing the result to the original plaintext message until a key is generated that matches the key used by the client device.

Figure 3:
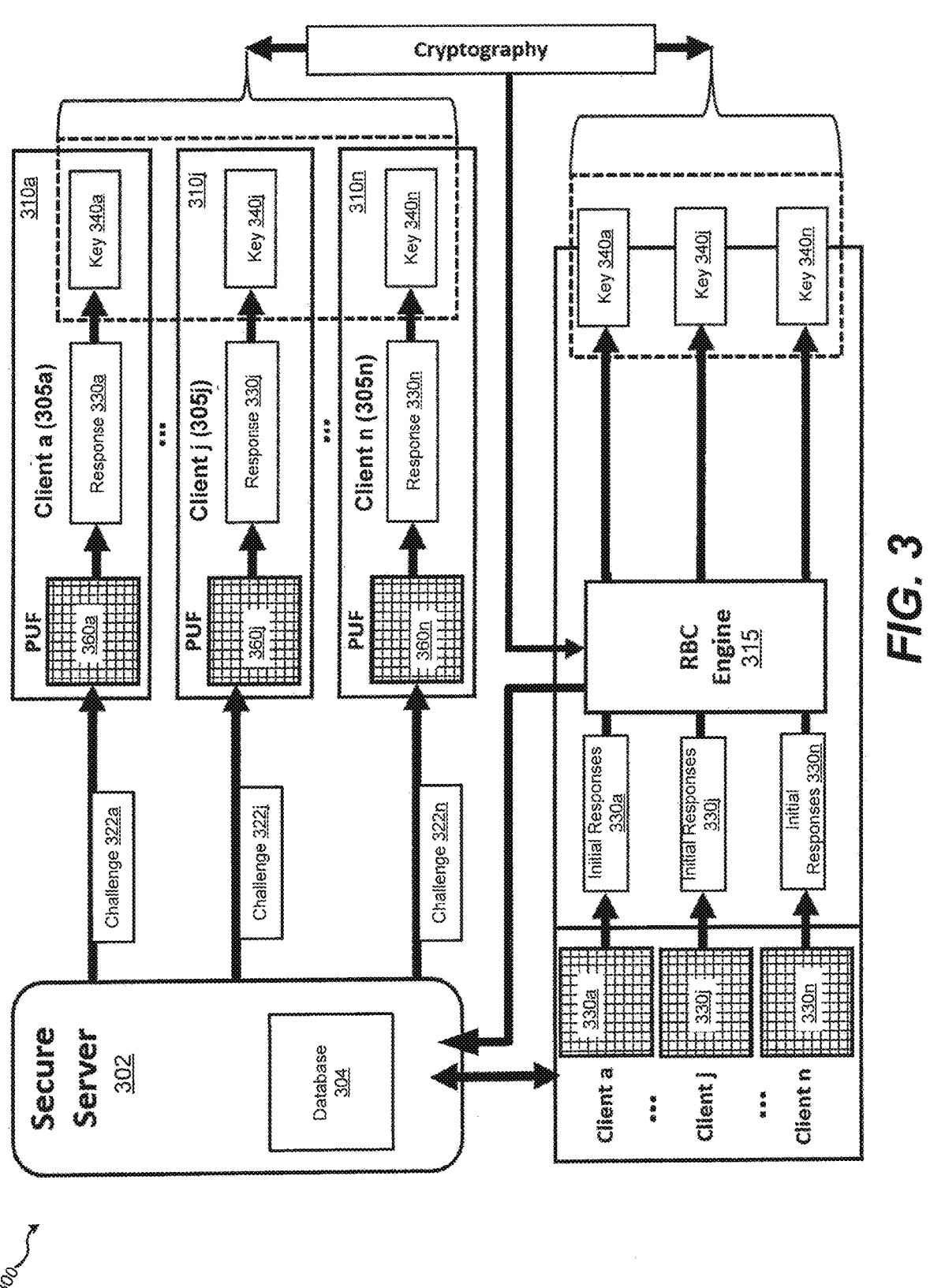
FIG. 3 is a block diagram of client devices with addressable PUF generators (APGs), interacting with a server having response-based cryptography (RBC engine according to one embodiment.

FIG. 3 illustrates and embodiment 300 where a server 302 includes a response-based-cryptography (RBC) engine (i.e., a search engine) (RBCE 315). Analogously to the server 202 of embodiment 200, the server 302 of embodiment 300 stores initial responses 330 for APGs 310 of clients 305 having PUF arrays 360 in a database 304. The server 302 receives keys 340 generated by clients 305 using APGs 310. However, in embodiment 300, helper instructions (e.g., the helper instructions 224 of embodiment 200) are not required because the server 302 is provided with the RBCE 315. The purpose of the RBCE 315, is to identify responses 330 from the initial responses 330 which produce encryption keys 340 which match the encryption keys 340 generated by the clients 305 when the client-generated responses 330 are consistent with the expected responses 330 to particular challenges 322 issued by the server 302. One exemplary process by which this may be accomplished is illustrated in connection with the arrangement shown in FIG. 4.

Figure 4:
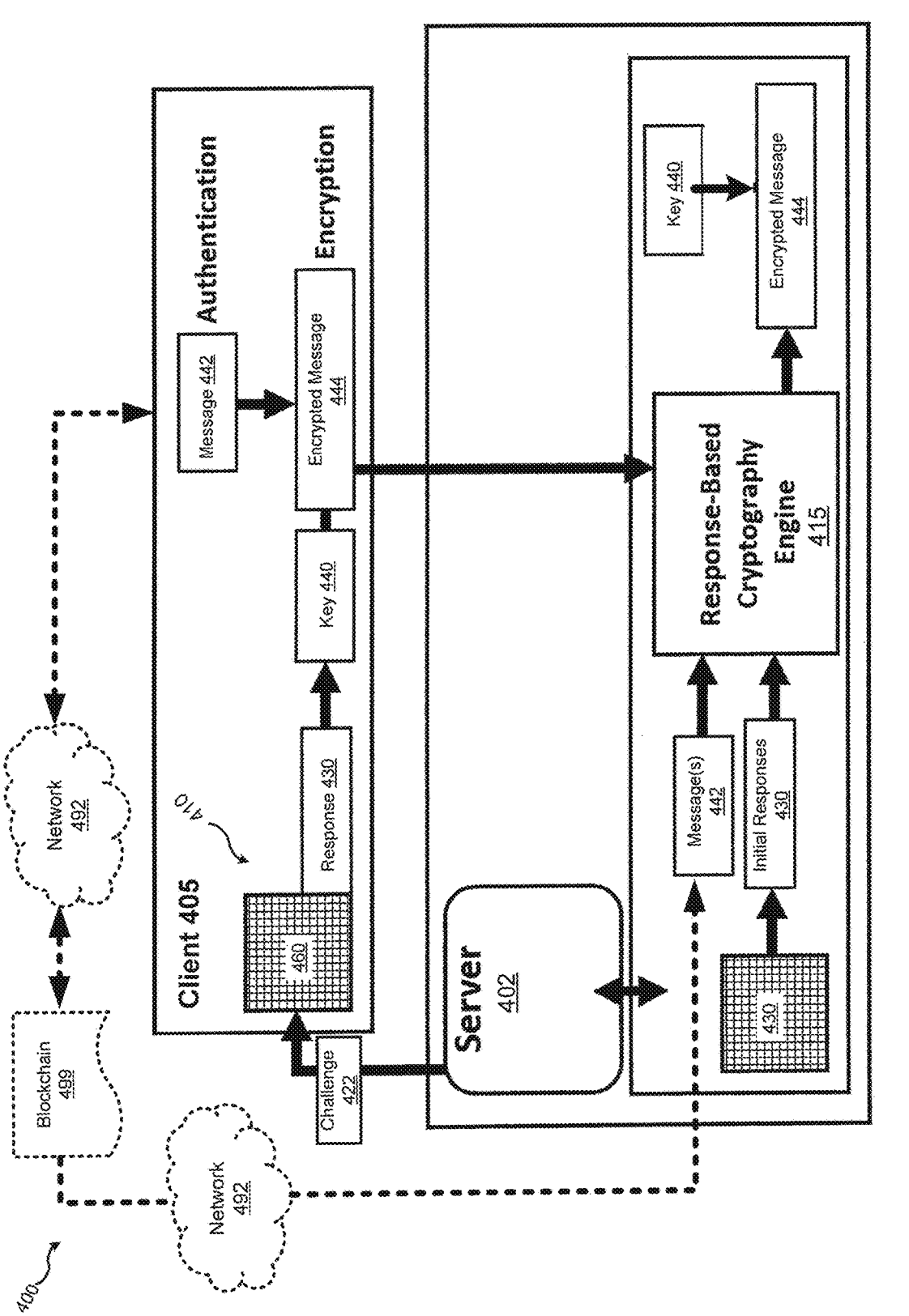
FIG. 4 is a block diagram depicting a procedure of authenticating a client in the embodiment of FIG. 3

FIG. 4 shows an example embodiment 400 in which a server 402 and a client 405 perform an example RBC authentication procedure. In embodiment 400, the server 402 issues an authentication challenge 422 to a client 405. The client 405 uses an APG 410 to generate a response to the authentication challenge 422 using its PUF array 460. The client 405 generates an encryption key 440 using the response 430. The client 405 then encrypts an authentication message 442 using the key 440 to produce a ciphertext 444 (i.e., a ciphertext). The server 402 uses the RBC engine 415 to independently encrypt the authentication message 442 using the initial response 430 to independently generate the ciphertext 444. If both ciphertexts match, the server 402 knows that it has successfully generated the same encryption key 440 and that the client 405 may be authenticated and further communication may commence using the key pair. In some embodiments, the server 402, rather than independently generating the ciphertext 444, may instead decrypt the ciphertext 444 received from the client 405 and verify that resulting plaintext is the expected authentication message 442 for the client 405. If the ciphertexts (or alternatively, plaintext the authentication messages 442) do not match, the RBC engine 415 may perform additional steps to determine that that they are nevertheless consistent with each other, as described below. Non-limiting examples of acceptable authentications messages include a user ID of the client 405 or other identifying information such as a secret shared by the client 405 and the server 402. In some embodiments, the client 405 and the server 402 may have access to a shared random number generator (RNG) and the shared secret may be a random number generated by that RNG. In other embodiments, the client 405 and the server 405 may be provided with synchronized RNGs. In some embodiments, the server 405 may store the authentication message 442 directly, while in other embodiments, the server 405 may store information related to the authentication message 442 along with instructions for generating the authentication message 442.

In some embodiments, one or both of the server 402 and the client 405 may optionally retrieve the authentication message 442 over a network (e.g., the network 492 shown in FIG. 4) such as a WAN, LAN, or the Internet as non-limiting examples. Various types of information may be used as the authentication message 442. As a non-limiting example, the authentication message 442 may be a block-chain transaction or other block which may have been generated by the client 405 and/or cryptographically signed by the client 405 which identifies the client 405 to the server 402. In this example, the server 402 may optionally retrieve the authentication message 442 from the blockchain 499 as shown in the FIG. 4. Similarly, the client 405 may write information to the blockchain 499 (e.g., a signed transaction block) and later retrieve the authentication message 442 from the blockchain 499 during authentication with the client 402.

For instance, in some embodiments, the client 405 may send a message to the server 402 to authenticate using a transaction block from the blockchain 499 as the authentication message 442. In this instance, the server may retrieve the transaction block identified by the client 405 from the blockchain 499 as the expected authentication message 442 and verify that it identifies the client when processed using methods disclosed above and elsewhere in the present disclosure. In some embodiments, the client 402 may transmit a public encryption key, a cryptographic signature, or other cryptographic output associated with the client as the authentication message 442. A public encryption key may be a public key corresponding to a private key previously used by the client 405 to generate a cryptographically-signed transaction block in the blockchain 499. In embodiments in which the client transmits a message explicitly identifying the corresponding transaction block in the blockchain 499, the sever 402 may access blockchain data of the blockchain 499 over the network 492 in order to retrieve a copy of the corresponding transaction block, public encryption key, cryptographic signature, and/or other cryptographic output from the blockchain 499 and determine that the client 405 may be authenticated as disclosed herein.

In some embodiments where the client 405 uses a public encryption key as the authentication message 442, the server may verify that the public key is associated with an authentic client 405 by a digital signature authority (DSA) by requesting validation of the public from the DSA via the network 492. In some embodiments, the server 405 may itself function as a DSA. In some embodiments the client 405 may transmit a message to the server 402 indicating a particular transaction block in the blockchain 499, signed with an encryption key in response to the challenge 422. The server 402 may use an asymmetric key generation algorithm to verify that that encryption key is a public key corresponding to a private key a generated from the challenge response stored by the server 402 in accordance with an asymmetric cryptographic scheme (e.g., RSA, elliptic curve cryptographic schemes, lattice cartographic schemes, multivariate cryptographic schemes, code-based cryptographic schemes, or another suitable asymmetric cryptographic scheme). In some embodiments, the client 405 may identify a transaction block signed by the client 405 prior to authentication along with a particular challenge 422 which the client 405 previously used to produce an encryption key with which the transaction block was signed by the client 405 as disclosed previously above. In such embodiments, the sever 402 may independently derive an encryption key using the initial response 430 corresponding to that challenge 422 and determine that the client is authentic using methods previously disclosed herein.

Figure 5A:
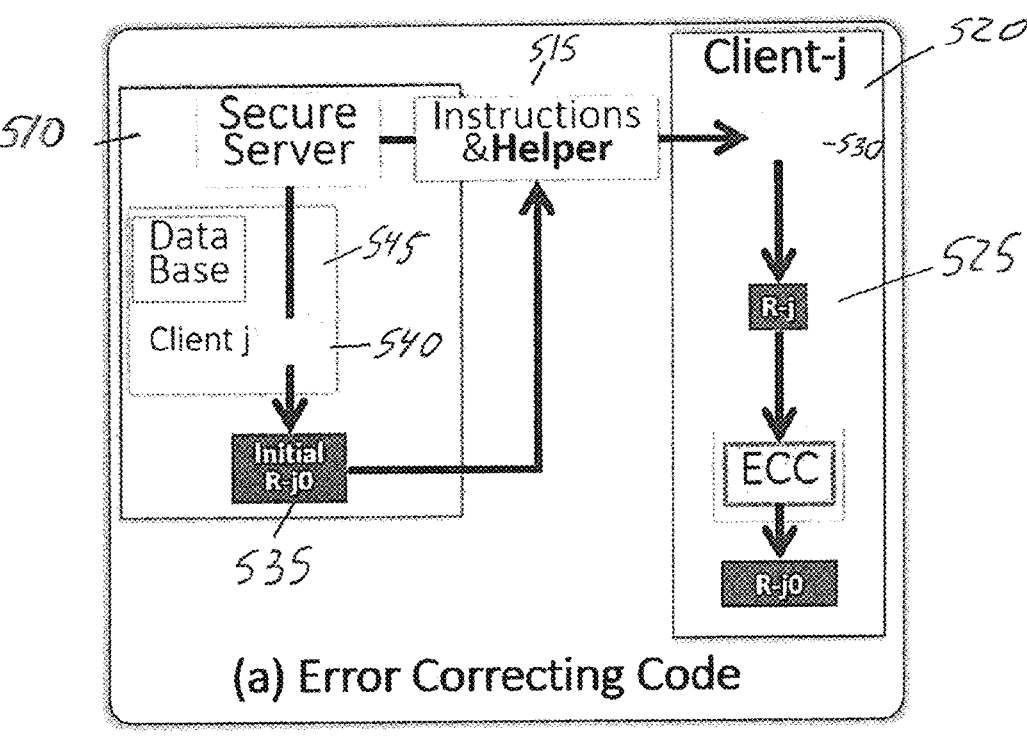
FIGS. 5A and 5B are a block diagrams comparing ECC and RBC key matching arrangements according to an inventive embodiment.
Figure 5B:
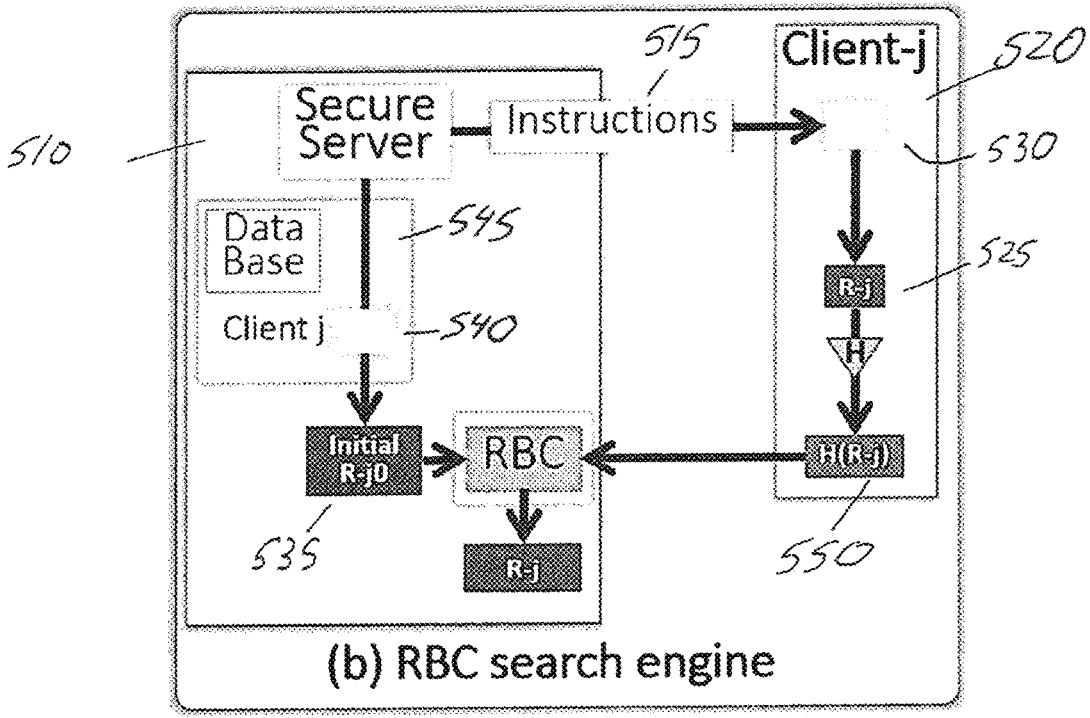

FIGS. 5A and B shows a comparison between (5A) ECC and (5B) use of an exemplary RBC search engine. In both cases the server 510 sends instructions 515 to the client device j 520 to generate the responses R-j 525 from its PUF 530. With ECC, the server also sends a data helper to allow the client device to recover the initial responses R-j0 535 that are computed by the server from the information stored in the database 545, which includes the initially measured PUF image 540 that was stored during the enrollment of the PUFs. The purpose of the server driven RBC is to uncover R-j (through an iterative process) from a cipher text or a message digest H(R-j) 550. One advantage of the RBC method is that it shifts the computing burden of the key recovery process from the client device to the server.

In accordance with this disclosure, RBC based methods may be extended to encrypted key recovery, where the search is employed at the client, rather than the server. This permits additional applications for client authentication and for cryptographic key pair generation. In these alternative embodiments, a server may pass a message to a client including an instruction set. The instruction set identifies, or at least is usable to identify, a set of addresses in the client's PUF array to be measured for responses. The client measures the responses, and uses the measured responses to generate a first (client) ciphertext. This may be done by any suitable method, for example, by using the responses as a seed for a key generation algorithm, or by hashing the response bit stream, for example. The ciphertext is then passed back to the server. Meanwhile, the server retrieves the previously measured PUF responses corresponding to the addresses identified (or identifiable) by the instruction set from its database. The server then generates a second (server) ciphertext with the retrieved (previously measured) responses, e.g., by hashing the responses or using some other ciphertext generation method, being the same method used by the client. The server may then determine whether the client is authentic (i.e., whether it is in actual possession of the previously measured PUF) by comparing the first ciphertext (generated with the client's measured PUF responses) with the second ciphertext (generated with the server's stored and previously measured PUF responses). If the ciphertexts match, the client is authenticated. Moreover, the response sets held by each device may be used as, or as the basis for, cryptographic keys permitting secure communication between the devices.

As is set forth above, however, a problem may arise when the client is in actual possession of the PUF, but that PUF's responses are subject to some drift mechanism such that contemporaneously measured responses are different from the previously measured responses stored at the server. This problem may be mitigated by masking or ignoring certain addresses. For example, during the enrollment process, which may involve repeated PUF measurements, erratic individual devices (i.e., devices prone to variability with time and repeated measurement) may be identified. The addresses of these erratic devices may be excluded from the instruction set, which will reduce the BER, and the consequential mismatch between the ciphertexts generated by the response sets. RBC provides another method, which may be used with address masking or independently, to also reduce RBC.

Generally speaking, when the ciphertext generated by the server does not match the ciphertext generated by client, the server may search for a set of responses that would produce the same ciphertext produced by the client. This process involves taking the response set retrieved from the database, and iteratively perturbing the responses (i.e. changing bits), generating a new ciphertext from the perturbed responses, and then comparing the new ciphertext with the ciphertext received from the client. This process can iterate until a match is achieved.

An upper limit may be placed on this process to reflect a condition where the received ciphertext is just too different from any ciphertext that can be generated with the previously stored responses. Under those conditions, the client may not be authenticated. One method to set this difference threshold is to limit the search scope to altered responses that are within a predetermined Hamming distance of the original (stored) responses. In preferred embodiments, the method generates all possible response that have a Hamming distance of 1 from the original responses, and if none of the generated ciphertexts match, the method iterates to responses having a Hamming distance of 2, then to responses having a Hamming distance of 3. This may continue, or the method may stop with a Hamming distance of 3.

When the server generates a ciphertext that matches the ciphertext received from the client, the client is determined to be authentic (i.e., is in possession of the PUF that was previously measured.) Additionally, the response that generates the matching ciphertext may be used as, or as the basis of, an encryption key. The client may generate a matching key with its own measured response. These keys may be used to carry on cryptographic communication between the devices.

Figure 6:
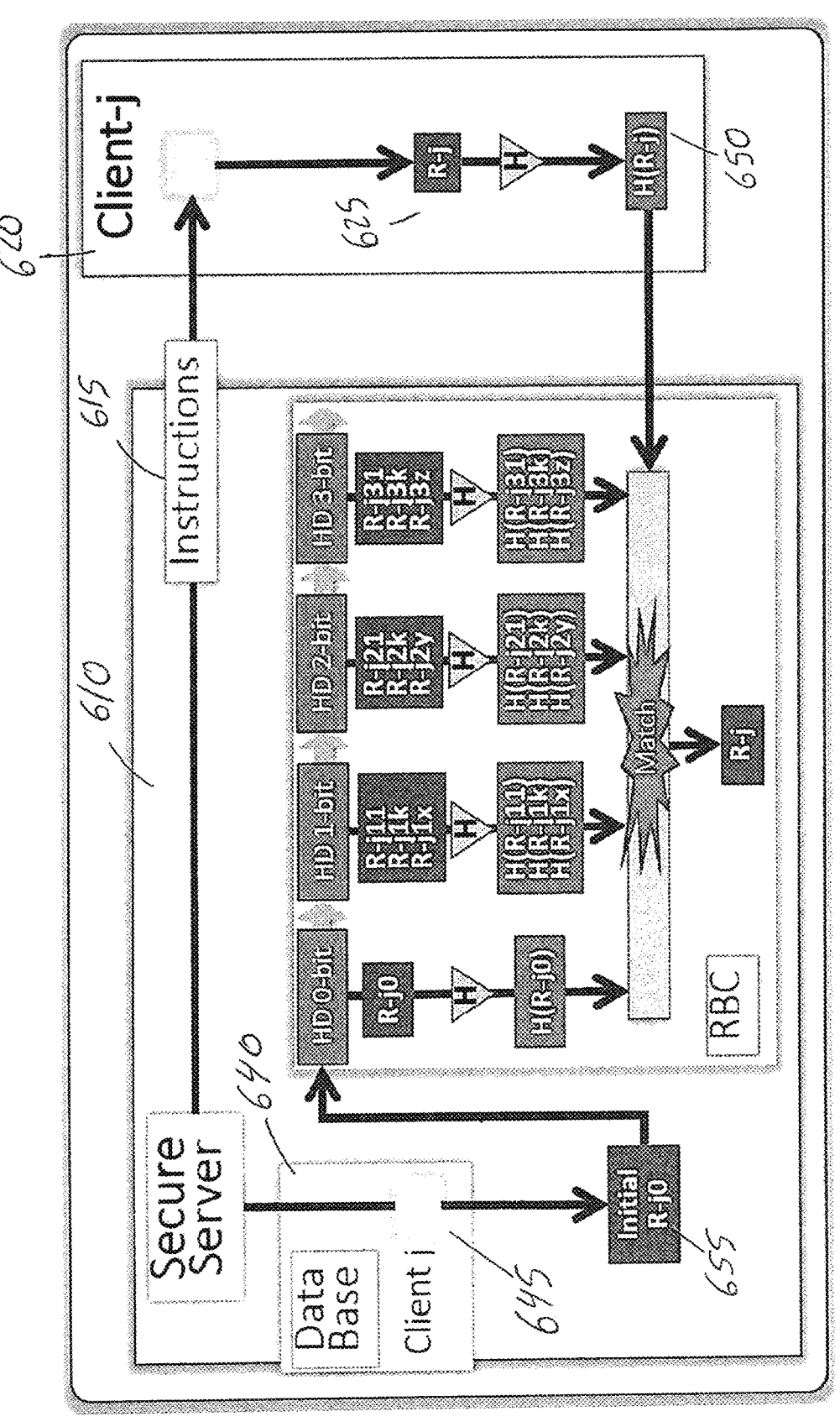
FIG. 6 is a flow diagram illustrating a method of authenticating a client using response fragmentation according to inventive methods.

FIG. 6 schematically illustrates exemplary steps of an RBC method. In the embodiment of FIG. 6, a server 610 provides instructions 615 to client 620. As in embodiments described above, instructions 615 may include a message digest which includes PUF challenge values, a plaintext message, information sufficient to generate PUF challenge values or a plaintext message, or any combination of the foregoing. Using the instructions, client 620 retrieves or generates PUF challenges and uses those challenges to generate an initial PUF response R-j 625. The client hashes the response generating a hashed response H(R-j) 650, which is sent back to the server as an authentication message digest. This message digest acts as the ciphertext message discussed in embodiments above.

Additionally, the server 610, using the same PUF challenge values sent to the client, retrieves from database 645's image of the initial PUF responses 640 an initial response R-j0 655 corresponding to the initially measured PUF responses to those challenge values. The server then hashes the initial response R-j0. This is computed from the database stored in the server after the enrollment of the PUF of client j. If H(R-j0)=H(R-j), then the initial response and the newly generated response by the PUF are identical. In this case, the Hamming distance between the two is zero, and the search can stop. If the responses are different, the search continues.

According to an exemplary search method, all possible responses R-1jk with k∈{1 to x} with the Hamming distance of 1 from R-j0 are generated by the RBC engine at or in network communication with the server. The natural number x is given by the combination $$\binom{N}{1}$$

in which N is the number of bits of the response R-j0. If the hashing of one possible response match is H(R-j), the search stops. If they are different, the search continues.

If the message digests do not match, the search engine iterates by increasing the Hamming distance step by step to uncover the erratic response R-j. At the iteration "i", the Hamming between the responses is "i", and the number of possible combinations is $$\binom{N}{i},$$

which increases exponentially with "i" and requires higher computing times. The burden of the RBC protocol is transferred to the server which can provide higher computing power and increased levels of security; the client's devices can operate at low power in non-secure environments.

While the RBC methods discussed above have certain advantages over the use of helper instructions and ECC, these methods also have challenges amenable to improvement. The computing power required of the server can be considerable for situations where the hamming distance between the message digests is large. Additionally, the latencies of the RBC search engine increase rapidly with the magnitude of the BERs of the freshly generated responses. Assuming that the Hamming distance between original and newly generated responses is "i", the average latency L(i) of the search is given by Equation 1:

$$L(i) = L(0)\left[1 + \binom{N}{1} + \binom{N}{2} + \dots + \left(\frac{1}{2}\right)\binom{N}{i}\right]$$

Both theoretical models and experimental data demonstrate that the latencies become prohibitive when the length of the responses is 256 bits, L(0) is in the 10 us range, and "i" exceeds 3. This corresponds to a BER in the 1.2% range, which is not unexpected.

In order to be able to handle higher response defect densities, in certain embodiments, the responses are fragmented into blocks by a factor k. For example, 256-bit long responses fragmented by k=4 become four 64-bit long blocks. Each block is hashed by the client device and communicated to the server for the RBC search. If the Hamming distance between each k block and the ones generated from the initial responses is "i", total Hamming distance between the full responses is k×i. Importantly, the average latency of a search with fragmentation by k of an N-bit long response is k times the latency of the search of a (N/k)-bit long response which is considerably faster. It is assumed that k is a natural number dividing the natural number N. The analysis discussed herein is based on N=256, and k∈{1, 2, 4, 8, 16, 32}.

The table of FIG. 12 shows the acceptable levels of BER for 256-bit long responses and various levels of fragmentations for latencies not exceeding 1 second. This fragmentation method can therefore accommodate high error rates while maintaining low latency. Security of the RBC when the responses are fragmented may be enhanced by the use of nonce and random numbers to expand the message fragment lengths. The sizes of the message digests needed for the protocol shown in FIG. 12 assume the use of SHA-256-in such cases, random numbers or nonce values may be used to expand the response fragments to 256 bits prior to hashing. In such cases, the extraneous bits are ignored during the search (that is, when the RBC is generating candidate matching fragments, it only changes the non-extraneous bits before hashing and comparing.

Fragmentation may also be advantageous where PUF response errors may not be distributed uniformly across the measured PUF response bit stream. Thus, if the measured PUF response is chunked or fragmented, many, if not most, of the chunks will be equal to the corresponding fragments (i.e., fragments including responses from the same PUF addresses) from the previously stored original responses. Iterative searching for matching responses, then, is only required for response fragments that do not match.

Thus, in an improved embodiment, the methodology discussed above in reference to FIG. 6 is employed, piecewise, on hashed message fragments, rather the hashed response as a whole. According to this method, client 620, after generating the response R-j, divides R-j into fragments, optionally adds bits to expand each fragment up to a predetermined bit count using nonce or random values, individually hashes each fragment, and then transmits the hash of each fragment to the server 610. Server 610 retrieves the initially stored response stream R-j0, fragments it in the same manner as the client, optionally expands each fragment with random or nonce bits, and hashes the resulting fragments. Under this method, each fragment will include responses (measured by the client, or retrieved from the server's database of previous responses) for the same set of PUF addresses. An RBC (preferably being run by the server, but optionally run on the client), then compares each corresponding pair of hashed fragments, e.g., the first hashed fragment from the R-j0 responses is compared to the first hashed fragment from the R-j1 responses, and so on. Where there is a mismatch between corresponding fragments, the iterative search algorithm is conducted for the mismatched fragment (that is, response fragments are generated that are 1 bit Hamming Distance from the initial fragment, then 2 bits, then 3 bits, etc., until there is a match). After the fragment is altered, it is hashed and again compared, and if there is no match the search continues. Preferably, in embodiments where the fragments are expanded with random/nonce bits, those bits are ignored in the search, and only bits from the actual response are altered in the search. When all fragments are matched, the client is authenticated.

In alternative cryptographic embodiments, when all fragments are matched, the server may generate a key from a response consisting of response fragments that returned immediate matches, assembled in order with fragments that were altered according to the search algorithm until there was a match. The client would have a corresponding key that resulted from its measured PUF responses. The key pair may then be used for cryptographic applications.

The fragmentation methods described above serve to lighten the computing load on whatever computing device is running the RBC search engine. Fragmentation may assist in moving RBC searching from the server to the client. Running the RBC search on the client opens the door for additional authentication and cryptographic communication applications not contemplated thus far in the art.

Additional improvements and applications employing the RBC methods introduced above will now be described.

Key Recovery Protocol Driven at the Client Device Level

In one embodiment, a client device may employ RBC in order to recover a session key Sk from an embedded PUF after awakening a client device. The session key may be one of many session keys that have been pre-generated, encrypted, and stored on the client device. Once recovered, the session key may be used as a symmetrical encryption key for communication with other devices that possess the same key (e.g., a server) or devices that have information permitting those devices to generate or recover a session key. The session key, or messages encrypted with the session key, may also act to authenticate the client with other devices also in possession of the session key. In the example that follows, it is assumed that the databases of the client device, which may store an encrypted copy of a session key, are not trusted and could be lost to an opponent. Therefore, the information stored on these databases is considered public information even without any attempt to post it.

Figure 7:
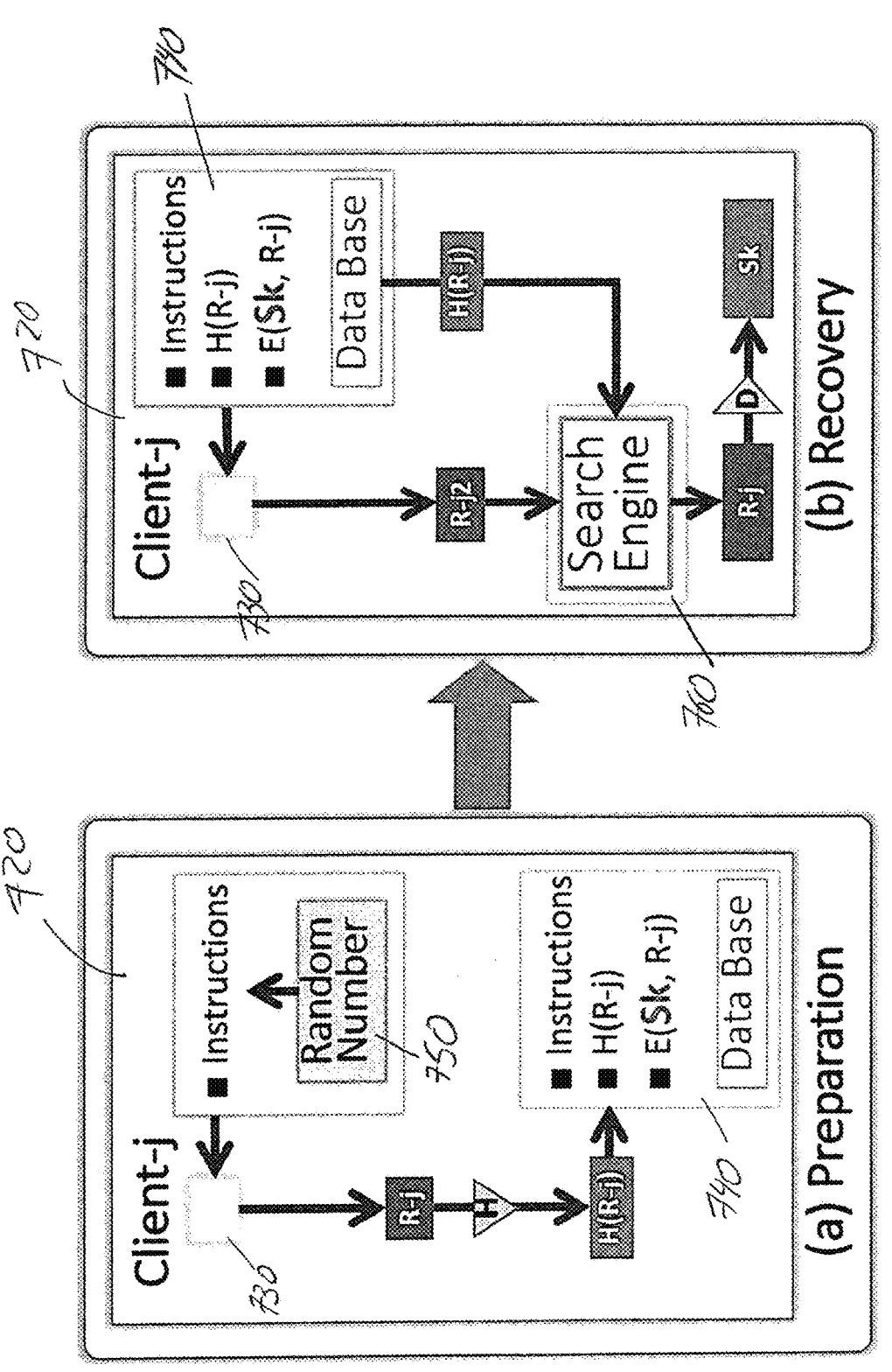
FIG. 7 is a flow diagram showing preparation and key recovery phases for a method allowing a client to recover a session key according to an inventive method.

As shown in FIG. 7, a client device 720, as in the arrangements depicted above, includes a PUF 730 and database 740. The client's processor may also run a random number generator 750 (or pseudorandom number generator, which may be used as a random number generator for all purposes described in this disclosure) and an RBC search engine 760. This is in contrast to previously described methods in which the RBC search is being run at a server device. In the embodiment of FIG. 7, during a preparation phase (a), instructions and challenges to generate PUF responses R-j are derived from a random number generator 750. This may be done by generating a random string directly which is translated into PUF challenges, or the output of the random number generator may be combined with other information (i.e., pre-stored information) to generate the PUF challenges. In alternative embodiments, rather than running an RNG itself, the client may receive a RNG from another device, such as a server. The PUF responses R-j returned in response to the instructions/challenges may be hashed resulting in a hashed response H(R-j). A session key Sk is then encrypted by using R-j as a cryptographic key or by a key generated from R-j (e.g., by a key generation method that takes R-j or a hash or expanded version of R-j as a seed). The client device may store in database 740 the instructions (i.e., the PUF challenges or information sufficient to generate the PUF challenges), a message digest including a hash of the responses H(R-j), and a cipher text E (Sk, R-j). This preparation step is preferably done in a secure environment. Preferably, the session key is not stored in unencrypted form on the client, and it may be deleted from the client upon completion of the preparation phases described herein.

According to certain embodiments, the client may recover the session key, on its own, without communication with a server. In a key recovery cycle, the client's previously stored information is retrieved by the client and the instructions are used to generate new responses R-j2 from the PUF array. These new responses R-j2 may not be identical to R-j due to the drifts of the parameters driving the PUF and/or the PUF measurement. The client hashes R-j2, and the client's RBC search engine process retrieves the message digest H(R-j) and compares it to a hash of R-j2. If there is a match, R-j2 is the same as R-j, and R-j2 is used to decrypt E (Sk, R-j) to recover the session key. If there is no match, the search engine searches for a variation of R-j2 that, when hashed, matches H(R-j). This may be done according to the RBC algorithms discussed above, for example in connection with FIG. 6, and the fragmentation method described thereafter. When a matching response is determined, that response will be equal to R-j, and it is used to decrypt the ciphertext and recover the session key Sk. An advantage of this method is that, even if database 740 is known to an opponent, the opponent cannot recover the session key without having access to the PUF, which as a PUF may have higher tamper-resistant properties. Hashing methods, such as SHA-128 or SHA-256, are extremely fast, and commercial implementations in hardware embedded in cryptographic processors are available. Unlike the way it is processed with ECC, there is no attempt to correct the responses using helpers and fuzzy extractors. In many cases, this results in lower latencies and smaller amounts of data being stored by the client device.

If the BER is high, in an alternative embodiment, the fragmentation methodology described previously can be introduced. In such embodiments, rather than a hash of the entire response string R-j1 being stored, the response string is fragmented, and the individual fragments are stored. As in the methods above, each response fragment may be expanded with random or nonce bits, to make the fragments compatible with a given hashing algorithm. For example, if 256-bit long responses are impacted by 7% BERs, a fragmentation by 4 may be applied. Each fragment is optionally filled with nonces and hashed. When SHA-128 is used, the stream stored in replacement of the single message digest is 512-bits long. During key recovery, the new (contemporaneously measured) response string (R-j2) is fragmented in the same manner. The hashed fragments are then compared, on a fragment by fragment basis. This reduces the computing power required by the client device.

One of the possible problems to be addressed is the fact that certain cells of the PUFs may be known upfront for being erratic. In order to mitigate this issue, and reduce BER, in certain embodiments it is advantageous for the client device to identify the location of the erratic cells, then to skip these cells during response generation. In an exemplary process, the client may measure the responses of all cells in the PUF multiple time (as would occur during the enrollment procedures described above). Cells with responses that varied in excess of a predetermined threshold would be identified and the identity of these erratic cells stored in the client database. This identification and masking process may be carried out during the preparation phase. The addresses of erratic devices would be excluded from generation of the initial response set R-j, and from all subsequent measurements of the PUF (i.e., the measurements generating R-j2). Exclusion of erratic cells, alone or in combination with the fragmentation techniques described above, lighten the computing load on the RBC search engine sufficiently to enable lower-power client devices to run the RBC search with acceptable latencies. In alternative embodiments, where RBC is conducted on the server side (such as is described below), the server will generally have access to more power consumptive computing resources, which may make this step unnecessary.

The random number generator used to derive the instructions (i.e., the PUF challenges) can also be used to generate the session keys or the data streams generating the keys. Other devices (e.g., a server) with a random number generator synchronized to the client RNG may generate the same session key. Alternatively other devices (e.g., a server) may have a copy of (or instructions and data sufficient to generate) a client's session key. That information may be stored in a secure manner in a secure database. For example, a server device with an image of a client's PUF and with a copy of E (Sk, R-j0), generated with the stored initial PUF responses and the client's instructions, may recover generate its own copy of Sk by the methods described herein. Alternatively, a server may securely store a copy of the session key. The session keys can be used for various symmetrical cryptographic communication techniques such as AES and DES or public key infrastructures such as Elliptic curves, RSA, and post-quantum cryptographic codes such as Dilithium, Kyber, NTRU, Falcon, Saber, Rainbow, and Classic McElicce. A session key, hashes thereof, or plaintext encrypted thereby may also be compared with the same data generated with a trusted copy in order to authenticate devices (i.e., a client as described in FIG. 7, or in FIG. 8 below). Moreover, while the method set forth above relates to the retrieval of session keys from an encrypted file, this method is applicable for the retrieval of any encrypted information located on the client device, or stored in memory in communication with a device like that of FIG. 7, whatever its purpose.

Key Recovery Protocol Driven by the Server

In another embodiment, methods similar to those discussed above may be used in conjunction with a server to recover a session key Sk from a client device including an embedded PUF after awakening a client device. Here, as in the example above, the databases of the client device are not trusted and could be lost to the opponents; thus, the information stored should again be considered public information.

Figure 8:
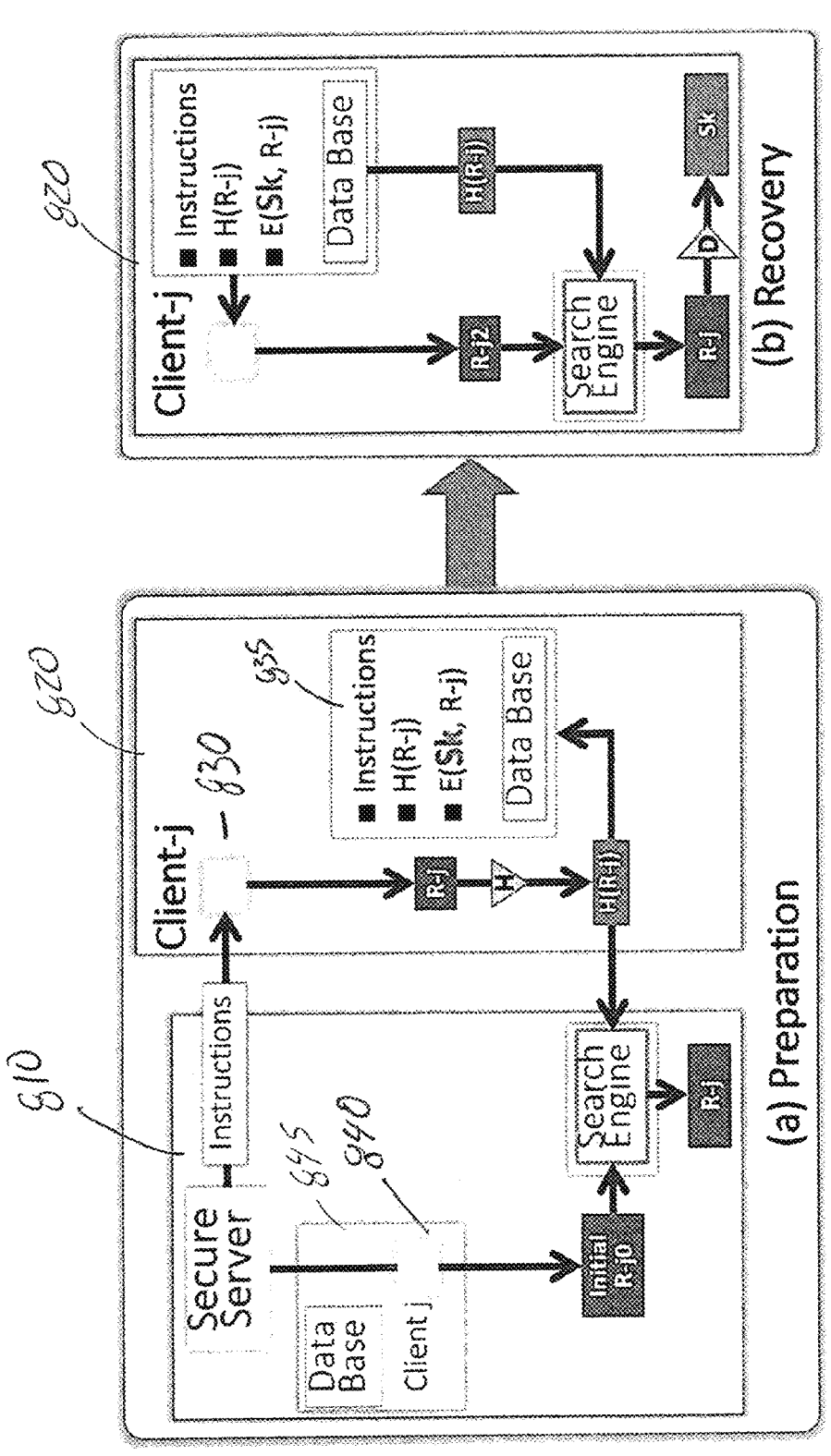
FIG. 8 is a flow diagram showing preparation and key recovery phases for an alternative server involved method of client key recovery.

In the arrangement of FIG. 8, a server 810 is in communication with a client 820. The client includes a PUF 830, which may be challenged with challenges (e.g., a list of addresses of addressable PUF elements), such that it returns responses. The server 810 includes an image of the PUF 840, which is a set of previously measured PUF responses in response to previous challenges. This image is stored in a server-side database 845.

As shown in FIG. 8, the preparation phase (a) is driven by the server in a way similar to the preparation phase described above in reference to FIG. 7. Here, however, the server may optionally provide instructions sufficient to generate a set of PUF challenges for the client's PUF. The server may generate the instruction set by any of the methods discussed above, including by using a random number generator. Alternatively, the client may generate the instructions, for example, with its own RNG, as in FIG. 7. The client extracts or otherwise generates the challenges from the instructions, and measures the response of PUF elements identified by the challenges, resulting in response R-j. This is hashed resulting in H(R-j), which is stored in the client side database 835. A session key Sk is then encrypted with R-j by the client and the resulting encrypted session key is stored, such that, as in the embodiment of FIG. 7, the client stores the encrypted session key, the instructions and the hash of the initial responses. The client does not store the session key, because again, the client's database is assumed to be unsecure.

During a recovery phase, recovery of the session key by the client proceeds in the same manner as described with respect to FIG. 7. The client retrieves the instructions, the hash of the initial responses and the encrypted session key from memory. It re-measures the PUF with the instructions, hashes the resulting responses, and compares the hash with the original hash. If there is no match, the responses are then iteratively altered until a matching has is produced, at which point, R-j has been uncovered. R-j is then used to recover the session key. The session key may then be checked by another device, also in possession of a copy of the session key (e.g., a server) to authenticate the client. Alternatively, the session key may be used as an encryption key to encrypt communications with another device (e.g., a server), which can decrypt the communication with its own copy of the session key, and vice versa.

Thus far, it has been described how the client of FIG. 8 can recover a session key, a secure copy of which may be present on another device such as a server. In alternative embodiments, the second device, e.g., the server, need not have a copy or image of the client's session key. In such alternative embodiments, the server device has an image of the client's PUF. In these cases, the server can recover the session key from information shared unsecurely by the client.

Referring still to FIG. 8, in an alternative embodiment the server 810 includes an image of the client's PUF stored in a secure database at the server. This image includes PUF responses (R-j0) that were measured by the server at some point, which may have been prior to the client's measured responses generated during the preparation phase (R-j). In this embodiment, the client may pass to the server a hash of its measured responses, H(R-j). This may be done during an initial preparation stage (e.g., at the same time that server communicates the instructions to the client), or it may be done as part of an authentication or handshaking process later. In certain cases, the server will store a copy of the instructions passed to the client. In cases where the client generates the instructions itself, these may be passed to the server. The client may also pass to the server the session key encrypted with the client measured responses E (Sk, R-j). Again, this may be done during the preparation phase, or during a handshake exchange later. If this occurs during a handshake exchange, it will be appreciated that this exchange may be assumed to be insecure—the result of the handshake is that the server is in possession of the instructions, H(R-j) and E (Sk, R-j), which information is assumed to be insecure and available to an attacker that has compromised the client's database.

Will those data in hand, the server may uncover the session key independently using the RBC methods described above. The server, using the instructions, retrieves corresponding stored initial responses R-j0 from the server database containing the PUF image. With knowledge of the message digest H(R-j), the server uses an RBC search engine to uncover R-j from the initial responses R-j0. This may be done according to the matching methods set forth above, for example, in connection with FIG. 6. Once the server uncovers R-j, it may use that response string to decrypt E (Sk, R-j) and uncover Sk. Sk can then be used with the matching Sk copy retrieved by the client for cryptographic communication and authentication (e.g., to encrypt data, to sign data, to validate cryptographic signatures, etc.).

It will be noted that is in this embodiment, both devices, client and server, are running RBC in order to uncover a pair of session keys from information that may be exchanged over unsecure channels. Again, the opponent cannot recover the session key without having access to the PUF which could have higher tamper-resistant properties or the server's image, which is assumed to be secure. This generally requires that the client have the PUF, and the server have an image of the PUF. It will be further appreciated that the BER and latency reduction techniques discussed above (e.g., masking erratic addresses and fragmenting the response and comparing hashed response fragments). Indeed, one of the advantages of this method is the fact the server may uncover the location of the cells of the PUFs that were initially tested as erratic during enrollment. This enables the server to exclude those cells from the instruction set, which reduces BERs and eliminates the need for the client devices to store databases tracking the erratic cells. The protocol also allows the server to independently generate the session key Sk which could be useful for some cryptographic protocols. The session keys can again be used for various symmetrical cryptographic such as AES and DES, or public key infrastructures such as Elliptic curves, RSA, and post-quantum cryptographic codes such as Dilithium, Kyber, NTRU, Falcon, Saber, Rainbow, and Classic McEliece. As above, while this methodology is directed to recovering Sk from an encrypted version of Sk, it could be applied to recovery of any encrypted piece of information.

Embodiment: Authentication and Audit Trails

In Government, industrial, and academic scenarios, many wish to have paper and electronic document tracking and authentication. This enables the possibility of security compliance tracking related to trust in both generation of electronic documents, as well as printed documents, when combined with secure multi-function printer solutions. The systems and methods described herein may be used to provide authentication and audit trails for electronic documents.

Generally speaking, a user device may have, or be in communication with a computing device serving the role of the client device discussed above in reference to FIGS. 7 and 8. In a secure environment, the user device receives or generates (e.g., with a random number generator) one or a series of session keys. The methodology below references a single session key, but it is understood that this process may be repeated for additional session keys. The user device generates an instruction set, preferably with a random number generator, and measures a set of PUF responses from its PUF. The user device then encrypts the session key with the PUF responses and generates a ciphertext from the PUF responses, e.g., by hashing the set of PUF responses. The user device stores the encrypted session key, the instructions, and the hash of the responses. The user device does not store any session key, because going forward, the user device's storage is assumed to be unsecure.

An exemplary process flow is as follows:

1. An individual generates a new document on their computer that is required to be authenticated and tracked (i.e., capable of establishing an audit trail). The individual user's device retrieves the response hash, the encrypted session key, and the instructions, accesses the PUF to generate responses, then searches for the original responses by comparison with the original response hash. This is done in accordance with the method described above in reference to, for example, FIG. 7. Once the original response is uncovered, the device uses it to decrypt the encrypted session key according to the methods set forth above. The session key is then used to cryptographically sign or encrypt the document. The document is sent for encrypted print (possibly through a print server).

2. The printer can authenticate the document's generation and will print, adding its own signature and additional information to the stored electronic information based on initial generation. The printer may authenticate the document by validating the signature with its own copy of the session key, or alternatively, generating its own copy of the session key with an image of the individual device's PUF, as explained above in connection with FIG. 8.

3. The reproduction device then is able to have security audit logging, information about who initiated printing the document, how many copies, etc. In addition, the device (if equipped) may be able to run integrity checks on itself to verify its firmware is not malicious or designed to steal documents, can restrict unauthorized access, etc.

4. The audit trail would be able to follow document generation, monitoring of the device, tracking of user access and activity for the document and track suspicious use.

5. In addition, the scanning portion of the printer can relate scanned or modified documents back to the original audit trail chain through secure OCR, perceptive-hashing, etc. The secure audit capabilities can be extended to archival of print/copy/scan jobs including control over downloads to the device.

The list described is for specific use but can be generalized to any document tracking from generation through replication and finally destruction.

Embodiment: Digital Media Copy Protection

Similar to High-bandwidth Digital Content Protection (HDCP), a more secure form of content protection could be created with the key recovery detailed previously. Traditional HDCP uses three systems: (1) authentication prevents non-licensed devices from receiving content, (2) encryption of data sent over digital links (HDMI, DP, DVI, etc.)

prevents eavesdropping of information from man in the middle (MITM) attacks, and (3) key revocation prevents compromised and cloned devices from receiving data. In practice these mechanisms are only for data transmission from one device to another, but this could be extended to streaming over the internet to another device as well, secured by user logon credentials. The utilization of key recovery would fit in:

1. Each device would have a unique fingerprint, where the key does not need to be transmitted; only the content playback device would send a small packet to a secure server for validation of rights to play the media through key recovery. A device's key would be one or more recoverable session keys, as described above, recoverable by access to a PUF at the device. The session key would allow for authentication of the device, user credentials, and would be usable to encrypt and decrypt content in conjunction with a matching key at a trusted server (e.g., a video service provider).

2. During an authentication, the client device to play the media would recover the one-time key related to their user credentials and would enable decryption of the content.

3. The encryption would be done by generic stream cipher, keyed with the recovered key 4. If the device is compromised there would be revocation sent back to the main server, blocking the device from further playback or notifying for additional actions to be taken.

5. By adding a key recovery, HDCP would be strong against current issues including cloning a device with only its public key, avoiding blacklist, faking key vectors, use aggregation to usurp DMCA authority. Key recovery could be extended through a root of trust to additional screens, circumventing problems where multiple screens are connected to a single receiver, something current methods do not allow.

Figure 9:
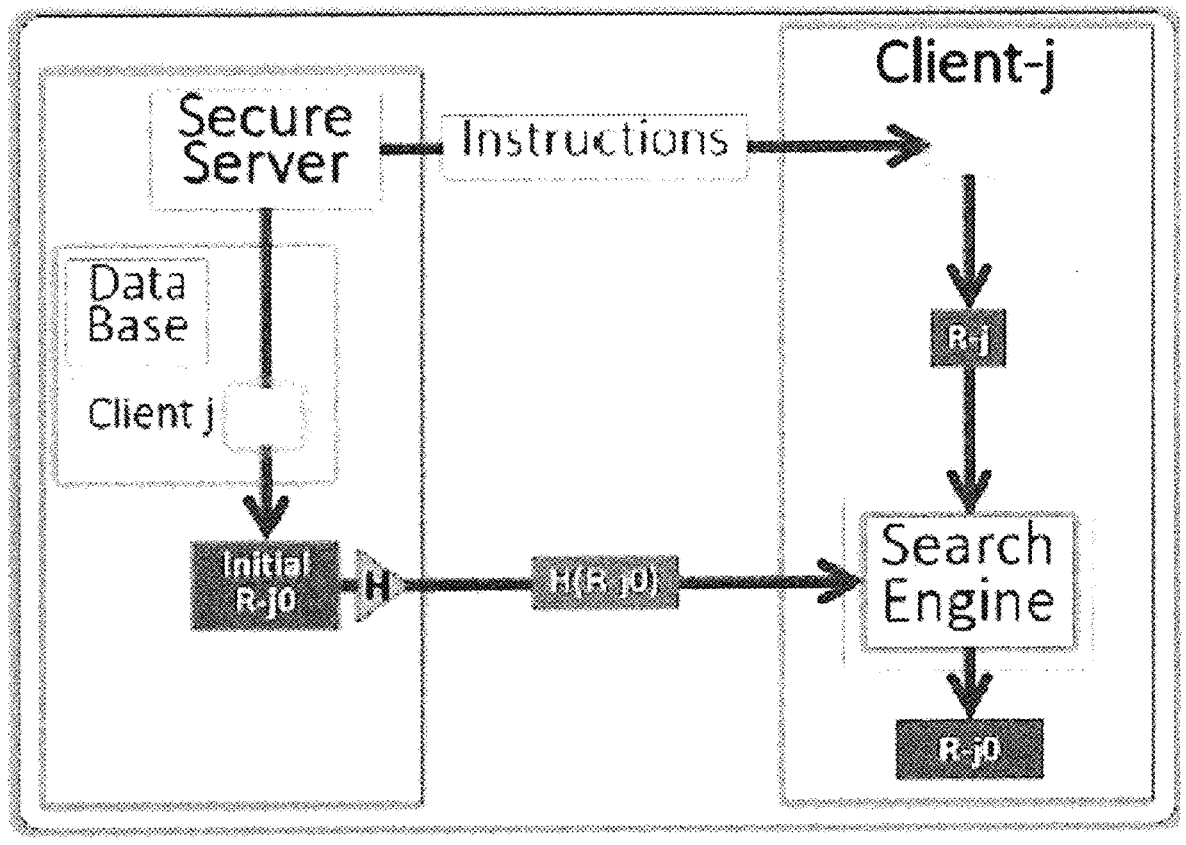
FIG. 9 is an alternative arrangement of PUF response matching executable on a client device.

6. All HDCP protocols currently have problems that would be alleviated with the PUF-based key recovery According to the protocols discussed in this disclosure, a search engine is used to replace an error correcting method, as shown in FIG. 9. As shown in FIG. 9, the set of instructions allows the generation of the responses R-j from the PUF which should be like the initial responses R-j0 extracted from the information stored by the server during enrollment. In lieu of generating a data helper from R-j0, the server hashes it to generate the message digest H(R-j0) which is transmitted to the client device. The client device has its own search engine to be able to recover R-j0 from R-j and the message digest H(R-j0). Various cryptographic protocols then use the shared responses to generate appropriate cryptographic keys. As needed, the fragmentation methodology is also used to deal with high BERs. In practical embodiments, the use of a ternary representation to track and eliminate the erratic cells results in BERs extremely low (in the 10e-5 range). Without fragmentation, a search engine able to handle Hamming distances of 3 in 256-bit long responses will reduce false reject rates well below the 10e-10 range.

Figure 10:
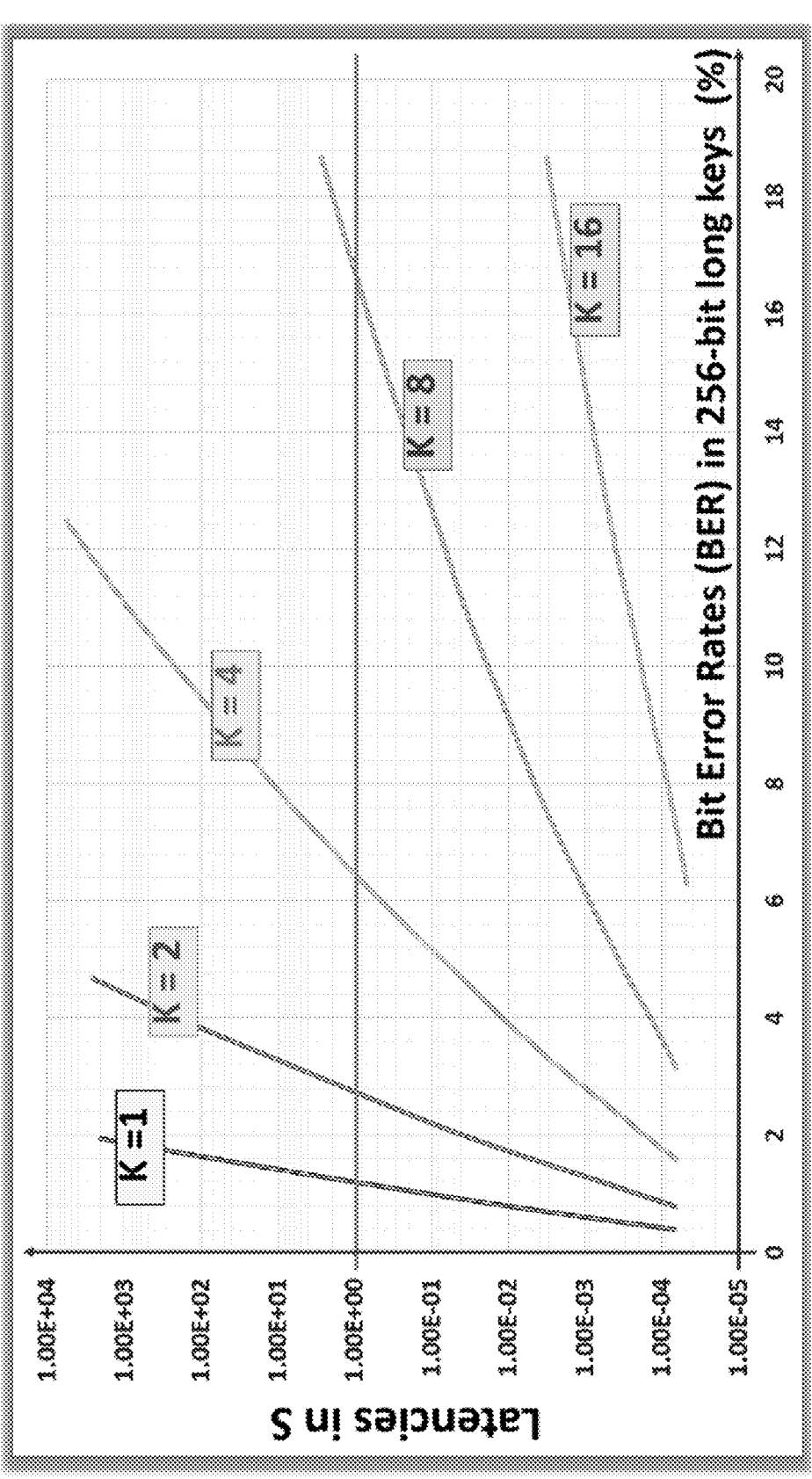
FIG. 10 depicts a modelling of the latencies of an RBC search at different levels of BER for 256-bit long keys and various fragmentation.

The methods discussed above were statistically modeled and used to compute the results shown in FIG. 10. They are consistent with the analysis summarized in the Table of FIG. 12. In this analysis, it is assumed that the processor, an Intel I7-7820 2.9 GHZ with 16 GB RAM, can process the single cycle L(0) of Equation 1 in 10 μs. The minimization of the BER below 1% for 256-bit long allows the use of a search without fragmentation and a single message digest of 256 bits.

Figure 11:
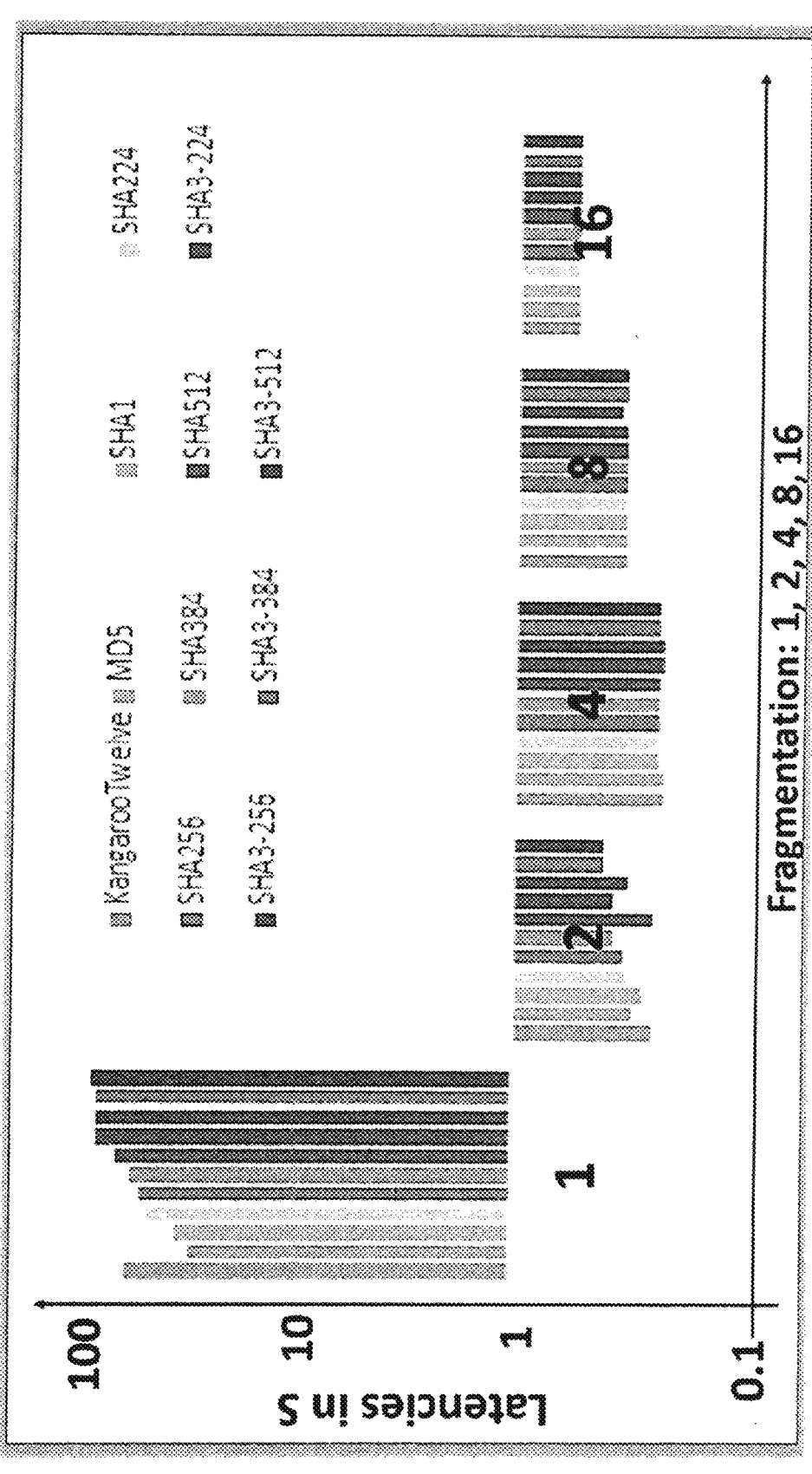
FIG. 11 depicts a modelling of the latencies of an RBC search at different levels of BER for 256-bit long keys and various fragmentation.

These results were confirmed by experiment. The experiments were run on the HPC's Skylake nodes, where each independent iteration used 28 cores. An experiment iteration will randomly generate a 256-bit seed, choose 5 bits at random to flip, and then split the stream of responses into N sub-streams. Each sub-stream was then padded with a remaining number of random bytes to make the sub-stream length add up to 256 bits. This makes up each full 256-bit sub-stream. Then it would iteratively run RBC over each sub-stream sequentially until it found the correct one, only searching over the sub-stream space (ignoring the mask nonce bits). This was repeated 100 times for all fragmentation levels of 1, 2, 4, 8, and 16 for each of the following hash functions: KangarooTwelve, MD5, SHA-1, SHA-224, SHA-256, SHA-384, SHA-512, SHA3-224, SHA3-256, SHA3-384, and SHA3-512. The results, which are shown at FIG. 11, are summarized as follows:

Latency vs. Fragmentation at 5 mismatches (BER=5/256): The main takeaway for these plots is that a fragmentation of 4 is the most efficient in terms of achieving the lowest latency possible before overhead of having so many sub-streams start to take effect. It is clear with the number of hash functions that the bar graphs are very cluttered. One thing to conclude from these results is that all SHA3 are basically the same in terms of workload, the SHA2s do not vary by very much, and SHA1 and MD5 are also equivalent.

It should be understood that, unless explicitly stated or otherwise required, the features disclosed in embodiments explicitly described herein and elsewhere in this disclosure may be used in any suitable combinations. Thus, as a non-limiting example, any embodiment disclosed herein may use the public-key matching techniques disclosed herein or omit said techniques, as dictated by the needs of a particular application. Similarly, any embodiment may use or omit use of the index instructions disclosed herein, and so on.

The invention claimed is:

1. A method of cryptographic communication from a client device having a physical-unclonable-function ("PUF") array having a plurality of PUF devices, comprising:

at the client device, receiving from a server including an image of the client's PUF and a set of instructions, where the image including measured PUF responses identifying a range of devices in the PUF array;

at the server:

receiving the instructions from the server;

recovering a session key in a recovery procedure comprising:

receiving a set of instructions including PUF challenges identifying a range of devices in the PUF array;

receiving a first ciphertext generated from a first set of measured PUF responses reflecting measurements of physical characteristics of devices of the PUF array identified by the PUF challenges;

receiving an encrypted session key generated by encrypting a session key using the first set of measured PUF responses;

measuring a second set of measured PUF responses reflecting measurements of physical characteristics of devices of the PUF array identified by the PUF challenges;

generating a second ciphertext from the second set of measured PUF responses;

comparing the second ciphertext with the first ciphertext; and when the second ciphertext matches the first ciphertext, using second set of measured PUF responses to decrypt the encrypted session key, and when the second ciphertext does not match the first ciphertext, performing a search with a client processor for a set of modified PUF responses a fixed Hamming distance from the second set of measured PUF responses, the modified PUF responses being usable to generate a ciphertext that matches the first ciphertext.

2. The method of claim 1, further comprising using the session key to encrypt or cryptographically sign a message, and sending the message to another computing device.

3. The method of claim 1, further comprising sending a cryptographic hash of the session key to another computing device for authentication of the client.

4. The method of claim 1, wherein generating a second ciphertext from the second set of measured PUF responses comprises generating a cryptographic hash of the second set of measured PUF responses.

5. The method of claim 1, wherein the first ciphertext is generated from the first set of previously measured PUF responses by performing a cryptographic hash of the first set of measured PUF responses.

6. The method of claim 1, wherein receiving the set of instructions, the first ciphertext and the encrypted session key comprises retrieving the set of instructions, the first ciphertext and the second ciphertext from a database at the client.

7. The method of claim 1, further including, executing a preparation procedure, comprising:

using a random number to generate the set of instructions including PUF challenges identifying a range of devices in the PUF array; measuring physical characteristics of devices of the PUF array identified by the PUF challenges to generate the first set of PUF responses; generating the first ciphertext using the first set of PUF responses and encrypting a session key using the first set of PUF responses.

8. A method for secure communication between a server computing device and a client computing device having a physical-unclonable-function ("PUF") array having a plurality of PUF devices, comprising:

at the server, generating a set of instructions including PUF challenges identifying a range of devices in the PUF array, and sending the instructions to the client;

at the client:

receiving the instructions from the server;

measuring a first set of PUF responses reflecting measurements of physical characteristics of devices of the PUF array identified by the PUF challenges;

generating a first ciphertext from the first set of PUF responses;

encrypting a session key with the first set of PUF responses;

storing, in a database at the client, the instructions, the first ciphertext and the encrypted session key;

recovering the session key, and encrypting or cryptographically signing a data file with the session key and sending the encrypted or signed data file to another computing device wherein recovering the session key comprises, at the client:

retrieving, from the database at the client, the instructions, the first ciphertext and the encrypted session key measuring a second set of PUF responses reflecting measurements of physical characteristics of devices of the PUF array identified by the PUF challenges;

generating a second ciphertext from the second set of PUF responses;

comparing the second ciphertext with the first ciphertext; and when the second ciphertext matches the first ciphertext, using the second set of PUF responses to decrypt the encrypted session key;

when the second ciphertext does not match the first ciphertext, performing a search with a client processor for a set of modified second PUF responses a fixed Hamming distance from the second set of measured PUF responses, the modified second PUF responses being usable to generate a third ciphertext that matches the first ciphertext, and using the modified second PUF responses to decrypt the encrypted session key;

and wherein the server has an image of the client's PUF, the image including previously measured PUF responses, the method further comprising at the client, sending to the server a copy of the first ciphertext and the encrypted session key; and at the server, determining the session key by:

retrieving a set of server PUF responses from the image using the instructions;

generating a server third ciphertext from the set of server PUF responses;

comparing the server ciphertext with the first ciphertext; and when the server ciphertext matches the first ciphertext, using the third set of server PUF responses to decrypt the encrypted session key;

when the server ciphertext does not match the first ciphertext, performing a search with a server processor for a set of modified server PUF responses a fixed Hamming distance from the set of server PUF responses, the modified server PUF responses being usable to generate a ciphertext that matches the first ciphertext, and using the modified server PUF responses to decrypt the encrypted session key.

9. The method of claim 8, further comprising, at the server, using the recovered session key to decrypt or verify the signed data file.

10. The method of claim 8, wherein, at the server, generating a set of instructions comprises excluding the addresses of known erratic PUF devices from a candidate instruction set.

* * * * *